United States Patent
Takagishi et al.

(10) Patent No.: US 8,761,170 B2
(45) Date of Patent: Jun. 24, 2014

(54) COMMUNICATION DEVICE, COMMUNICATION METHOD, INTEGRATED CIRCUIT, AND PROGRAM

(75) Inventors: Satoru Takagishi, Osaka (JP); Masaru Fuse, Osaka (JP); Yosuke Matsushita, Osaka (JP)

(73) Assignee: Panasonic Corporation, Osaka (JP)

( * ) Notice: Subject to any disclaimer, the term of this patent is extended or adjusted under 35 U.S.C. 154(b) by 133 days.

(21) Appl. No.: 13/512,902

(22) PCT Filed: Sep. 14, 2011

(86) PCT No.: PCT/JP2011/005172
§ 371 (c)(1),
(2), (4) Date: May 31, 2012

(87) PCT Pub. No.: WO2012/046390
PCT Pub. Date: Apr. 12, 2012

(65) Prior Publication Data
US 2012/0236854 A1    Sep. 20, 2012

(30) Foreign Application Priority Data

Oct. 7, 2010   (JP) ................................ 2010-228012

(51) Int. Cl.
*H04L 12/56*   (2006.01)
(52) U.S. Cl.
USPC ........................... 370/389; 370/349; 709/218
(58) Field of Classification Search
USPC ........... 370/331, 389, 401, 349; 709/201, 218
See application file for complete search history.

(56) References Cited

U.S. PATENT DOCUMENTS 7,346,770 B2 * 3/2008 Swander et al. ............... 713/153
7,346,926 B2 * 3/2008 Vaarala et al. .................. 726/14
(Continued)

FOREIGN PATENT DOCUMENTS

| JP | 2006-295909 | 10/2006 |
| JP | 2008-236278 | 10/2008 |

OTHER PUBLICATIONS

International Search Report issued Nov. 22, 2011 in International (PCT) Application No. PCT/JP2011/005172.

(Continued)

*Primary Examiner* — Edan Orgad
*Assistant Examiner* — Emmanuel Maglo
(74) *Attorney, Agent, or Firm* — Wenderoth, Lind & Ponack, L.L.P.

(57) ABSTRACT

A terminal device includes a connection environment check unit, a determination purpose port mapping command unit which issues a port mapping command to a lower layer NAT device, and a determination packet generation unit which generates a determination packet which is source-routed. Additionally, a determination packet transmitting unit transmits the determination packet, a determination packet receiving unit receives the determination packet transmitted from the determination packet transmitting unit, passing through the upper layer NAT device a and the lower layer NAT device a and arriving at the terminal device a, and a port number obtainment unit obtains a WAN-side port number of the lower layer NAT device a indicated in the received determination packet.

8 Claims, 14 Drawing Sheets

(56) References Cited

U.S. PATENT DOCUMENTS

| | | | |
|---|---|---|---|
| 7,522,618 B2 | 4/2009 | Hamamoto et al. | |
| 8,165,157 B1* | 4/2012 | Taubert et al. | 370/466 |
| 2004/0088537 A1* | 5/2004 | Swander et al. | 713/153 |
| 2004/0128554 A1* | 7/2004 | Maher et al. | 713/201 |
| 2006/0209822 A1 | 9/2006 | Hamamoto et al. | |
| 2007/0058644 A1* | 3/2007 | Brahmbhatt et al. | 370/401 |
| 2007/0189490 A1* | 8/2007 | Sung | 379/219 |
| 2007/0192434 A1* | 8/2007 | Kodama et al. | 709/218 |
| 2008/0259943 A1* | 10/2008 | Miyajima et al. | 370/401 |
| 2010/0008260 A1* | 1/2010 | Kim et al. | 370/254 |
| 2012/0011189 A1* | 1/2012 | Werner et al. | 709/202 |
| 2012/0072548 A1* | 3/2012 | Kim | 709/219 |
| 2012/0099599 A1* | 4/2012 | Keranen et al. | 370/392 |
| 2012/0144475 A1* | 6/2012 | Boire-Lavigne et al. | 726/11 |

OTHER PUBLICATIONS

Hideo Yoshimi et al., "NAT Traversal Technology of Reducing Load on Relaying Server for P2P Connections", The Institute of Electronics, Information and Communication Engineers, IEICE Technical Report, vol. 106, No. 236, NS2006-81, Sep. 7, 2006, pp. 63-68, with English translation.

Tomohiro Fujisaki et al., "Optimizing Communications Under Multiple NATs Environment", IPSJ SIG Technical Report [CD-ROM (Dec. 2009)], vol. 2009-IOT-7, No. 5, Dec. 15, 2009, pp. 1-6, with English translation.

Prakash Iyer et al., "Internet Gateway Device: 1, Device Template Version 1.01 (Universal Plug and Play Internet Gateway Device (IGD) Version 1.0)", Nov. 12, 2001.

J. Rosenberg et al., "RFC 3489: STUN—Simple Traversal of User Datagram Protocol (UDP) Through Network Address Translators (NATs)", retrieved from the Internet: <URL: http://www.ietf.org/rfc/rfc3489.txt>, Mar. 2003.

* cited by examiner

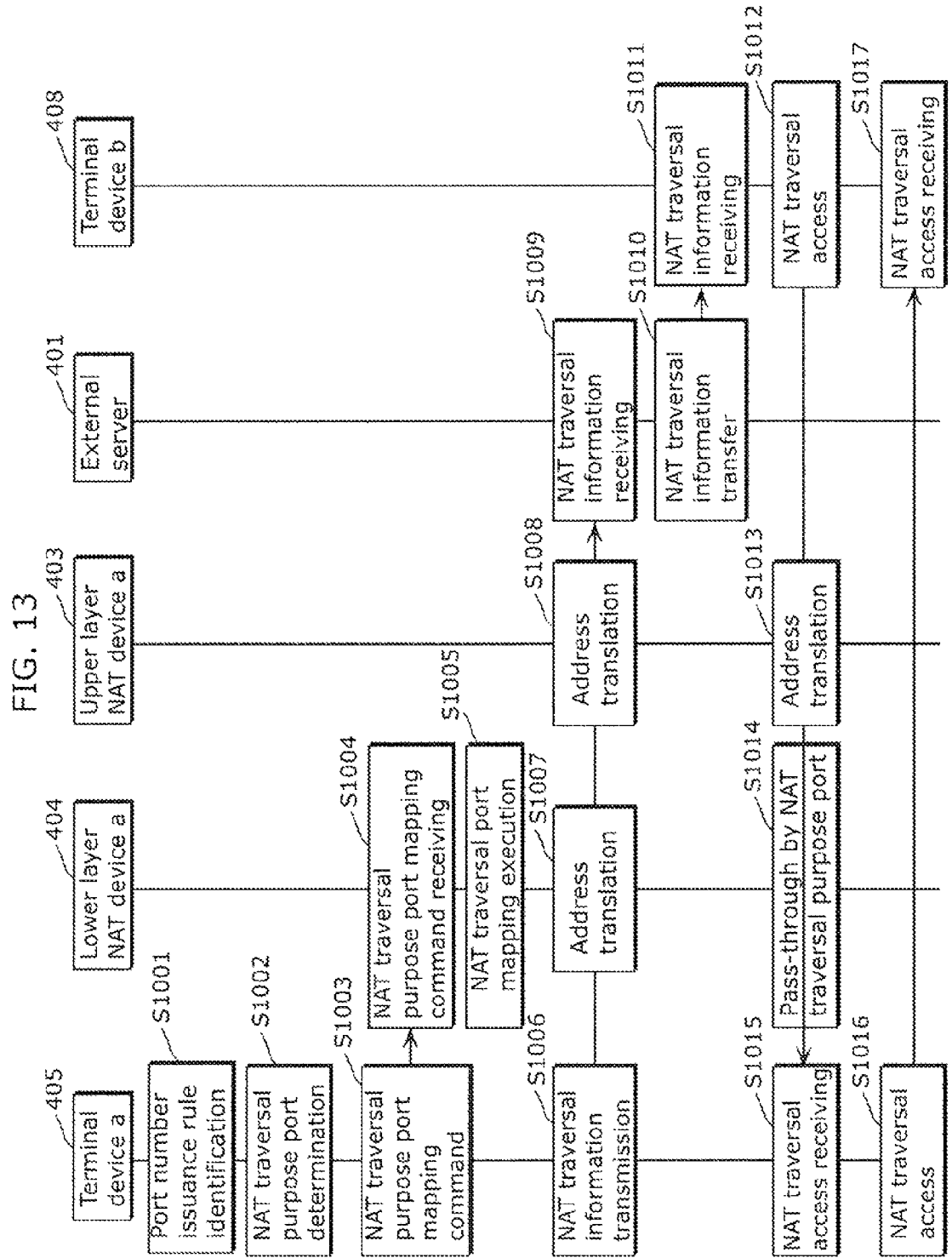

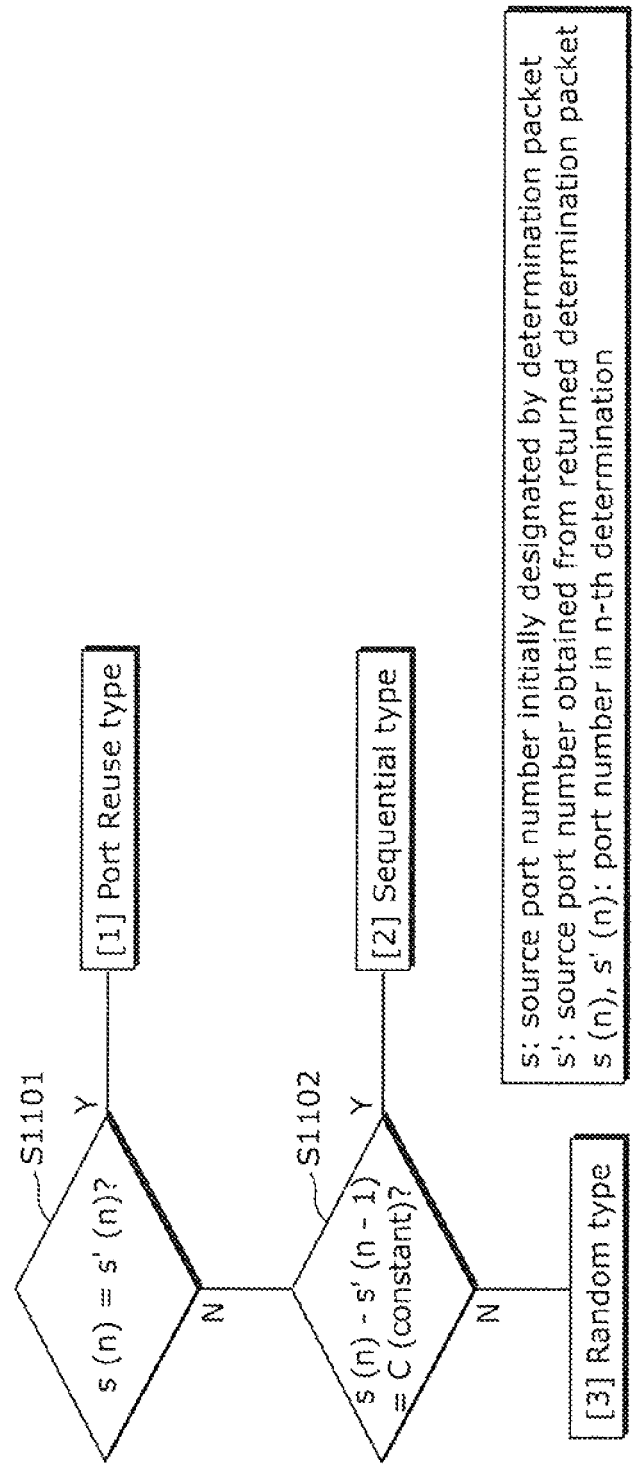

COMMUNICATION DEVICE, COMMUNICATION METHOD, INTEGRATED CIRCUIT, AND PROGRAM

BACKGROUND OF INVENTION

1. Technical Field

The present invention relates to a communication device, a communication method, an integrated circuit, and a program for communicating from a Wide Area Network (WAN) side beyond a network relay device which has a Network Address Translation (NAT) function.

2. Background Art

In a communication method using a conventional Internet technique, a global Internet Protocol version 4 (IPv4) address (hereafter described as global IP address) which is an address uniquely determined for each of the devices is assigned to the device directly connecting to the Internet.

However, the number of global IP addresses is limited, and especially Internet access services for households, there are many cases where only one global IP address is assigned per service contract. In other words, only one device can directly connect to the Internet per service contract.

Therefore, a network configuration using a private IP address and a router having the NAT function (hereafter referred to as NAT device) is widely used such that a plurality of devices whose number exceeds the number of available global IP addresses can simultaneously communicate with a device on the Internet.

It should be noted that the private IP address is an IP address for use in a closed (private) network such as a network device debugging and within businesses, although it cannot be used as a source IP address and a destination IP address of a packet on the global Internet.

Moreover, the NAT device is a network relay device which holds a Network Address Translation (NAT) function of performing a mutual conversion between a global IP address and a private IP address.

It should be noted that in the present identification, the claims, and the drawings, "NAT" is used by including a meaning of Network Address Port Translation (NAPT) which also performs a port translation.

The NAT function will be described with reference to FIG. 1. In the case where a communication packet bound for a communication device 104 on its own Wide Area Network (WAN) side are transmitted from a communication device 101 on its own Local Area Network (LAN) side, a NAT device 102, as the NAT function, has a function of transferring the communication packet to an upper level network (Internet 103).

The NAT device 102, in the transfer, rewrites the source IP address and the source port of the communication packet into a WAN-side IP address of the NAT device 102 itself and a newly assigned port number, respectively. Then, a reply packet which returns as a reply, after a rewrite of the destination IP address and the port number by the NAT device 102 according to an address translation table 105, is transferred to the communication device 101.

In an example of FIG. 1, the NAT device 102 having an IP address of "10.0.0.1" on the WAN side receives a packet bound for an 80 port of a destination IP address of "10.0.0.2" transmitted from a 10000 port of the communication device 101 having an IP address of "192.168.0.2".

On the receiving of the packet, the NAT device 102, with reference to the address translation table 105, first checks whether or not the source IP address and the source port of the received packet already exist in the address translation table 105. As a result, in the case where there are no corresponding data in the address translation table 105, an address translation table 105 is newly generated.

In the example of FIG. 1, a case is assumed where there are no corresponding data and an address translation table 105 using a source port number 20000 is newly generated. It should be noted that the source port number to be used for newly generating the address translation table 105 may be any port number as long as the number is not used for another address translation.

After newly generating the address translation table 105, the NAT device 102, according to the generated address translation table 105, rewrites "192.168.0.2" which is the source IP address and the source port number "10000" of the received packet into an IP address of "10.0.0.1" and a port number "20000," respectively, and then transmits the packet to the communication device 104 having an IP address of "10.0.0.2".

Then, on the receiving of a reply packet bound for the 20000 port of the destination IP address of "10.0.0.1" transmitted, as the reply, from the communication device 104, the NAT device 102 refers to the address translation table 105 and then rewrites "10.0.0.1" which is the destination IP address and "20000" which is the destination port number into an IP address of "192.168.0.2" and a port number "10000," respectively.

With this, the communication device 101 can communicate with the communication device 104 without the influence of the address translation performed in the NAT device 102, can transmit information with respect to the communication device 104, and can obtain information from the communication device 104.

However, a criterion for newly assigning a port number in an address translation of the NAT function or a port number issuance rule is different for each product.

Specifically, the criterion for assigning a port number in an address assignment of the NAT function is mainly classified into three kinds and the port number issuance rule is also mainly classified into three kinds.

FIG. 2 shows a criterion classification for assigning a port of the NAT function. FIG. 2 shows, in (1), an assignment criterion classification called a Cone type which is a classification for always assigning the same port in the address translation regardless of whether destination IP addresses of a server A, a server B, and the like that are communication partners and a destination port belongs to a port p or a port q.

FIG. 2 shows, in (2), a port assignment criterion classification called an Address Sensitive type which is a port assignment criterion classification which changes an assigned port according to the destination IP addresses of the server A and the server B that are communication partners. However, the same port is always assigned in the address translation without depending on whether the destination port of the communication partner is the port p or the port q.

FIG. 2 shows, in (3), a port assignment criterion classification called a Port Sensitive type which is a port assignment criterion classification which changes an assigned port according to the destination IP addresses of the server A and the server B that are communication partners and changes the port assignment also according to whether the destination port is the port p or the port q.

FIG. 3 shows a port number issuance rule classification of the NAT function. FIG. 3 shows, in (1), a port number issuance rule classification called a Port Reuse type which is a classification for assigning, also to the NAT device, the same port as a source port number of a communication packet transmitted by a terminal. It should be noted that another port is assigned in the case where a port is already used in the address translation table of the NAT device.

FIG. 3 shows, in (2), a port number issuance rule classification called a Sequential type and shows a case where each of the three communication packets, from the terminal, is sequentially transmitted with the use of a 1 port, a 3 port, and a 5 port as a source port.

In the Sequential type, regardless of the source port of the communication packet transmitted by the terminal, port numbers are assigned at a regular interval (in FIG. 3, regular interval Δ=5) in a sequence of the transmitted communication packets. The interval between the adjacent port numbers is different for each product.

FIG. 3 shows, in (3), a port number issuance rule classification called a Random type which is a port number issuance rule classification for irregularly assigning port numbers regardless of the source ports of communication packets transmitted by the terminal and their sequence.

Moreover, there is also a case where the NAT function of the NAT device, from a standpoint of security, has a function of filtering based on a source IP address or a port number of a communication packet that comes from the WAN side.

As described above, as long as communication is started from a terminal under control of the NAT device, the network configuration using the private IP address and the NAT device allows the terminal to directly communicate with another device on the Internet.

However, so as to perform communication from another device on the Internet or perform peer to peer (P2P) communication between two terminals under control of different NAT devices, communication must be mutually performed through a traversal of the NAT device by each of the terminals on the side of the communication partner terminal.

This is generally called "NAT traversal". The NAT traversal is performed by using a NAT device corresponding to an Internet Gateway Device (IGD) of Universal Plug and Play (UPnP) which is disclosed in Non Patent Literature 1 or using a NAT device corresponding to NAT Port Mapping Protocol (NAT-PMP), or Simple Traversal of UDP through NATs (STUN) which is disclosed in Non Patent Literature 2. With this, it is possible for P2P communication to be performed.

However, the former method directly controls a port of the NAT device from a terminal and therefore stable communication and connection can be expected, but the NAT device without corresponding to the IGD of UPnP or the equivalent function cannot be used for P2P communication.

Moreover, there is a possibility that STUN can correspond to many NAT devices by using an external server. However, depending on NAT classifications of the NAT devices existing on a communication route and their combination, communication packets are blocked by the filtering function of the NAT device and the NAT traversal cannot be performed. In other words, the method using STUN is inferior in certainty to the method using UPnP.

Especially, in a multilayer NAT environment in which there are two or more NAT devices, a feature of the NAT device having the strictest restriction is dominant and therefore a connection success rate by STUN is further decreased.

Patent Literature 1 discloses a method for enhancing a connection rate, by exchanging, between terminals via an external server, NAT classification determination result information of the NAT device and information about the presence or absence of UPnP compatibility, and by then performing the NAT traversal using STUN, the NAT traversal using the IGD of UPnP or NAT Port Mapping Protocol (NAT-PMP), or the like, even in the multilayer NAT environment in which there are two or more NAT devices between the external server and the terminals.

CITATION LIST

Patent Literature

[PTL 1]
Japanese Unexamined Patent Application Publication No. 2008-236278

Non Patent Literature

[NPL 1]
Universal Plug and Play Internet Gateway Device (IGD) V 1.0, http://upnp.org/specs/gw/UPnP-gw-InternetGatewayDevice-v1-Device.pdf
[NPL 2]
J. Rosenberg, et al. "RFC3489, STUN—Simple Traversal of User Datagram Protocol (UDP) Through Network Address Translators (NATs)", [online], March 2003, retrieved from the Internet: <URL: http://www.ietf.org/rfc/rfc3489.txt>

SUMMARY OF INVENTION

However, the technique disclosed in PTL1 can perform NAT traversal with UPnP only in the case where in the multilayer NAT environment having two or more NAT devices, all the NAT devices correspond to the IGD of UPnP and the like. In other words, in the case where there is even one NAT device not corresponding to the IGD of UPnP and the like, NAT traversal with STUN is performed. However, in reality, the scope of UPnP application is small and the NAT traversal by STUN is mainly applied as a result, and therefore there is a problem that an effect of an increase in the connection rate in the multilayer NAT environment is limited.

Especially as a countermeasure plan against the problem of global IPv4 address exhaustion, as shown in FIG. 4, a Large Scale NAT (LSN) is considered for an Internet Service Provider (ISP) to set up a NAT device with the NAT function on an ISP level at a facility within the ISP management or a similar device and to assign a private IPv4 address to each of the service users. Therefore, the number of multilayer NAT environments will be increased in the future.

The LSN device is a device managed by the ISP and is not considered to support control from the user terminals. In other words, a possibility is estimated to be extremely low that NAT traversal using a port mapping setting by the IGD of UPnP and the like can be applied.

It should be noted that in FIG. 4, an ISP NAT device 202 and an ISP NAT device 207 correspond to the above described LSN device.

As shown in FIG. 4, a case is assumed where P2P communication is performed between a terminal device 206 under control of the ISP NAT device 202 and a terminal device 209 under control of the ISP NAT device 207. In this case, even if the scheme of PT1 is used, the LSN devices (ISP NAT devices 202 and 207) each are not equipped with a port mapping setting function such as the IGD of UPnP, with a result that NAT traversal using a STUN server 201 is forced to be performed. However, there are many cases where connection cannot be performed by a combination of the NAT device 205 and a NAT device 208. In other words, there are many cases where the NAT traversal cannot be performed.

Moreover, even if a user is forced to control the NAT device 205 or the NAT device 208 and perform a static port mapping setting, the LSN device does not support the control from the user and therefore the NAT traversal cannot be performed.

Here, as described above, by the combination of the NAT device 205 and the NAT device 208, the availability of the NAT traversal is varied. In other words, this means that considered from a user point of view, there are a partner with who can perform P2P communication and a partner with who cannot perform P2P communication even if the partners hold the same terminals which can perform P2P communication.

At this time, there are many cases of dissatisfaction among users with companies which sell terminals and companies which provide services.

The present invention has an object to provide a communication device, a communication method, an integrated circuit, and a program which can easily establish NAT traversal communication in the multilayer NAT environment which includes a NAT device having no port mapping setting function such as the IGD of UPnP and the like.

A communication device according to an aspect of the present invention is a communication device which communicates with a server device connected to the Internet, via (i) an upper layer Network Address Translation (NAT) device connected to the Internet and (ii) a lower layer NAT device connected to the upper layer NAT device, the communication device comprising: a connection environment check unit configured to collect information indicating a Local Area Network (LAN)-side Internet Protocol (IP) address of the upper layer NAT device and information indicating a Wide Area Network (WAN)-side IP address of the lower layer NAT device; a determination purpose port mapping command unit configured to issue a port mapping command for the lower layer NAT device to transfer a packet to the communication device, the packet arriving at a predetermined port number of the lower layer NAT device; a determination packet generation unit configured to generate a determination packet which is source-routed, the determination packet generation unit including: a relay destination determination unit configured to determine, as a relay destination of the determination packet, the LAN-side IP address of the upper layer NAT device collected by the connection environment check unit; a final destination determination unit configured to determine, as a final destination of the determination packet, the WAN-side IP address of the lower layer NAT device collected by the connection environment check unit; and a destination port determination unit configured to determine, as a destination port number of the determination packet, a same port number as the predetermined port number used for the port mapping command; a determination packet transmitting unit configured to transmit the determination packet generated by the determination packet generation unit; a determination packet receiving unit configured to receive the determination packet which is transmitted from the determination packet transmitting unit, passes through the upper layer NAT device and the lower layer NAT device, and arrives at the communication device; and a port number obtainment unit configured to obtain a WAN-side port number of the lower layer NAT device which is a source port number indicated in the determination packet received by the determination packet receiving unit.

With this configuration, a source port number can be obtained after translation by the lower layer NAT device in the case where a packet is transmitted by the communication device according to the present aspect. In other words, information is obtained for identifying a port number of the WAN side used in the lower layer NAT device in a subsequent upstream transmission from the communication device.

As a result, it is possible for the lower layer NAT device to be set such that a packet which arrives at the port number on the WAN side is transferred to the communication device. With this, other devices connected to the Internet can be made to access the communication device by a traversal of the lower layer NAT device.

Moreover, a communication device according to an aspect of the present invention may further include a NAT traversal information notification unit configured to cause the server device to notify NAT traversal information to an other communication device communicating with the server device, by transmitting a notification request packet to the server device with use of a same source port number as the source port number of the determination packet generated by the determination packet generation unit, wherein the NAT traversal information may include the WAN-side IP address and the WAN-side port number of the upper layer NAT device which are indicated in the notification request packet received by the server device.

With this configuration, for example, information necessary for the NAT traversal can be efficiently notified to another communication device that is a communication partner.

Moreover, a communication device according to an aspect of the present invention may further include a port number issuance rule identification unit configured to identify a port number issuance rule which is a rule for determining a WAN-side port number used for communication in the lower layer NAT device, wherein the determination packet transmitting unit may be configured to transmit a plurality of determination packets including the determination packet, the determination packet receiving unit may be configured to receive the determination packets transmitted by the determination packet transmitting unit, the port number obtainment unit may be configured to obtain the WAN-side port number of the lower layer NAT device which is indicated in each of the determination packets received by the determination packet receiving unit, and the port number issuance rule identification unit may be configured to identify the port number issuance rule based on a plurality of WAN-side port numbers including the WAN-side port number obtained by the port number obtainment unit.

With this configuration, for example, identification of a port number issuance rule of the lower layer NAT device can be efficiently performed. In other words, the efficient obtainment of information used for performing the NAT traversal by another communication device becomes possible.

Moreover, a communication device according to an aspect of the present invention may further include a NAT traversal purpose port determination unit configured to (i) determine, as a NAT traversal purpose port number, a WAN-side port number used by the lower layer NAT device for transferring a packet transmitted next from the communication device, and (ii) determine a source port number of a notification request packet corresponding to the NAT traversal purpose port number, the WAN-side port number being identified with use of a port number issuance rule identified by the port number issuance rule identification unit; a NAT traversal purpose port mapping command unit configured to issue a port mapping command for the lower layer NAT device to transfer a packet to the communication device, the packet arriving at a NAT traversal purpose port number determined by the NAT traversal purpose port determination unit; and a NAT traversal information notification unit configured to cause the server device to notify NAT traversal information to an other communication device communicating with the server device, by transmitting the notification request packet to the server device with use of a source port number determined by the NAT traversal purpose port determination unit, wherein the NAT traversal information may include the WAN-side IP address and the WAN-side port number of the upper layer NAT device which are indicated in the notification request packet received by the server device.

With this configuration, for example, a process related to setting for the NAT traversal with respect to the lower layer NAT device is efficiently performed and notification of the NAT traversal information to another communication device is accurately performed.

In an aspect of the present invention, the determination packet transmitting unit may be configured to transmit the determination packets having mutually different source port numbers, and the port in number issuance rule identification unit may be configured to identify the port number issuance rule according to whether or not (a) a source port number of each of the determination packets when transmitted by the determination packet transmitting unit is identical to the WAN-side port number obtained by the port number obtainment unit, or (b) a difference is constant between two successively obtained WAN-side port numbers among WAN-side port numbers sequentially obtained by the port number obtainment unit.

With this configuration, for example, the port number issuance rule can be accurately identified even in the case where it is uncertain about which of various port number issuance rules is adopted by the lower layer NAT device.

Moreover, the present invention can be implemented as a communication method that includes characteristic processes performed by a communication device according to any of the above described aspects.

Moreover, the present invention can be implemented as a program for causing a computer to execute each of the processes included in the communication method of the present invention and as a recording medium having the program recorded thereon. Furthermore, the program can be distributed via a transmission medium such as the Internet or a recording medium such as DVD.

Moreover, the present invention can be implemented as an integrated circuit that includes characteristic component units performed by a communication device according to any of the above described aspects.

According to the present invention, if it is possible to set a port mapping as indicated by the lower layer NAT device corresponding to UPnP even in the case where the NAT devices are in cascading connection, the address translation rule of the lower layer NAT device and the port number on the WAN side used by the lower layer NAT device can be obtained.

Therefore, based on these pieces of information, port mapping can be performed with the use of the port mapping setting function of the IGD of UPnP such that the port for receiving a packet of the communication device is identical to the port on the WAN side used by the lower layer NAT device. With this, in the multilayer NAT environment in which the port mapping function such as the IGD of UPnP is not supported in the upper layer NAT device, NAT traversal can be easily realized in a packet transmission with respect to a communication device located at a terminal of a network. Specifically, the NAT traversal can be realized by only an addition of function expansion only to the communication device.

BRIEF DESCRIPTION OF DRAWINGS

FIG. 13 is a diagram showing an example of a communication as sequence including NAT traversal according to Embodiment 2.

FIG. 14 is a diagram showing an example of a processing flow for identifying a port number issuance rule of the lower layer NAT device according to Embodiment 2.

DETAILED DESCRIPTION OF INVENTION

Hereafter, embodiments of the present invention will be described with reference to the drawings.

LSN identifications are not definite according to carriers and ISP policies and ideas, but a possibility is high that a NAT port assignment criterion will be a Cone type after considering connectivity and compatibility with the existing applications.

Restriction on NAT is easier for a Cone type NAT than for the two other types. Therefore, a result of application, to a multilayer NAT environment, of the NAT classification identification scheme between an external server and a terminal which is a conventional scheme such as STUN is that a NAT restriction condition of a customer NAT device which is a lower layer NAT device is dominant. As a result, for example, identification is performed as shown in FIG. 5.

Figure 1:
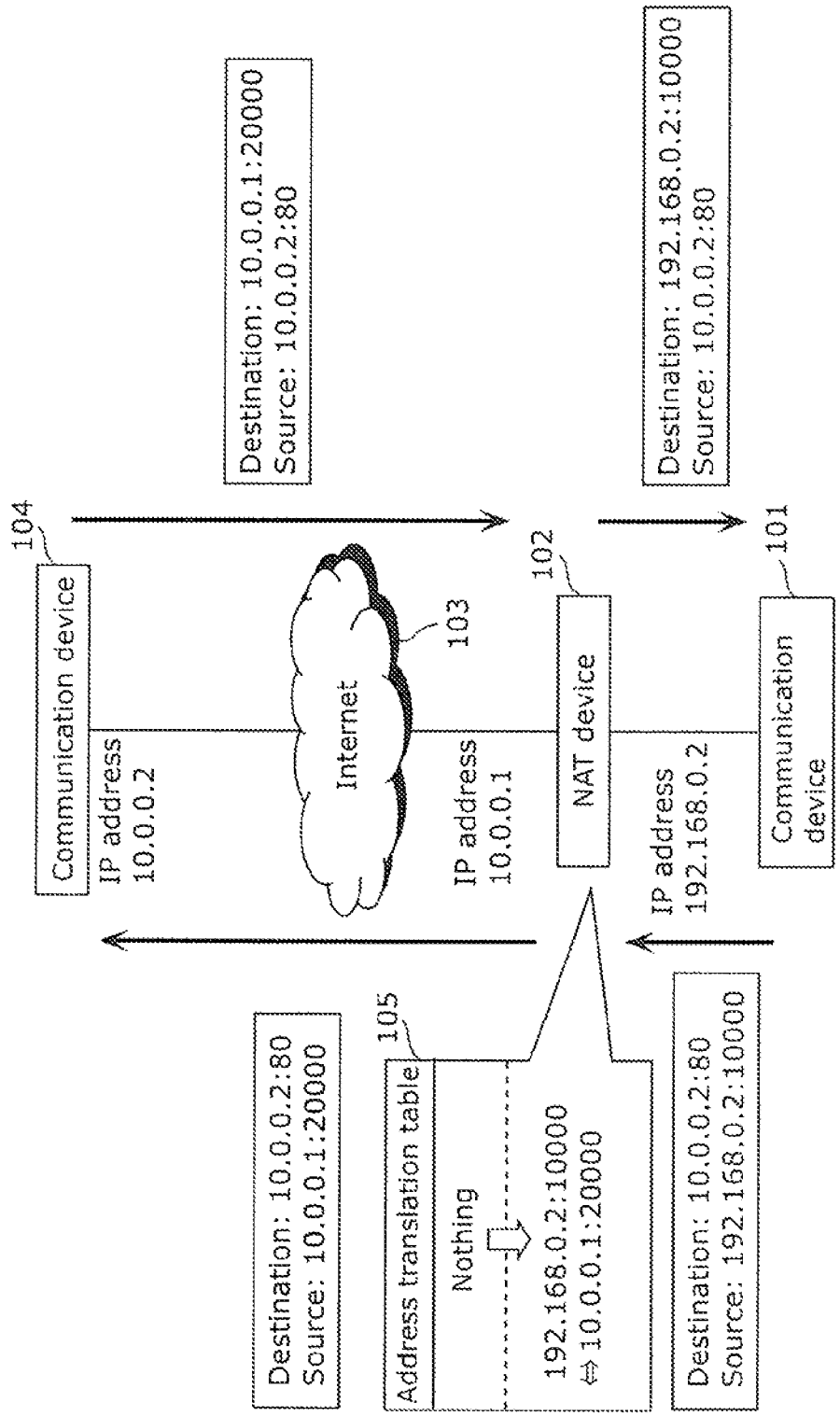
FIG. 1 is a diagram for explaining an outline of a conventional NAT function.
Figure 2:
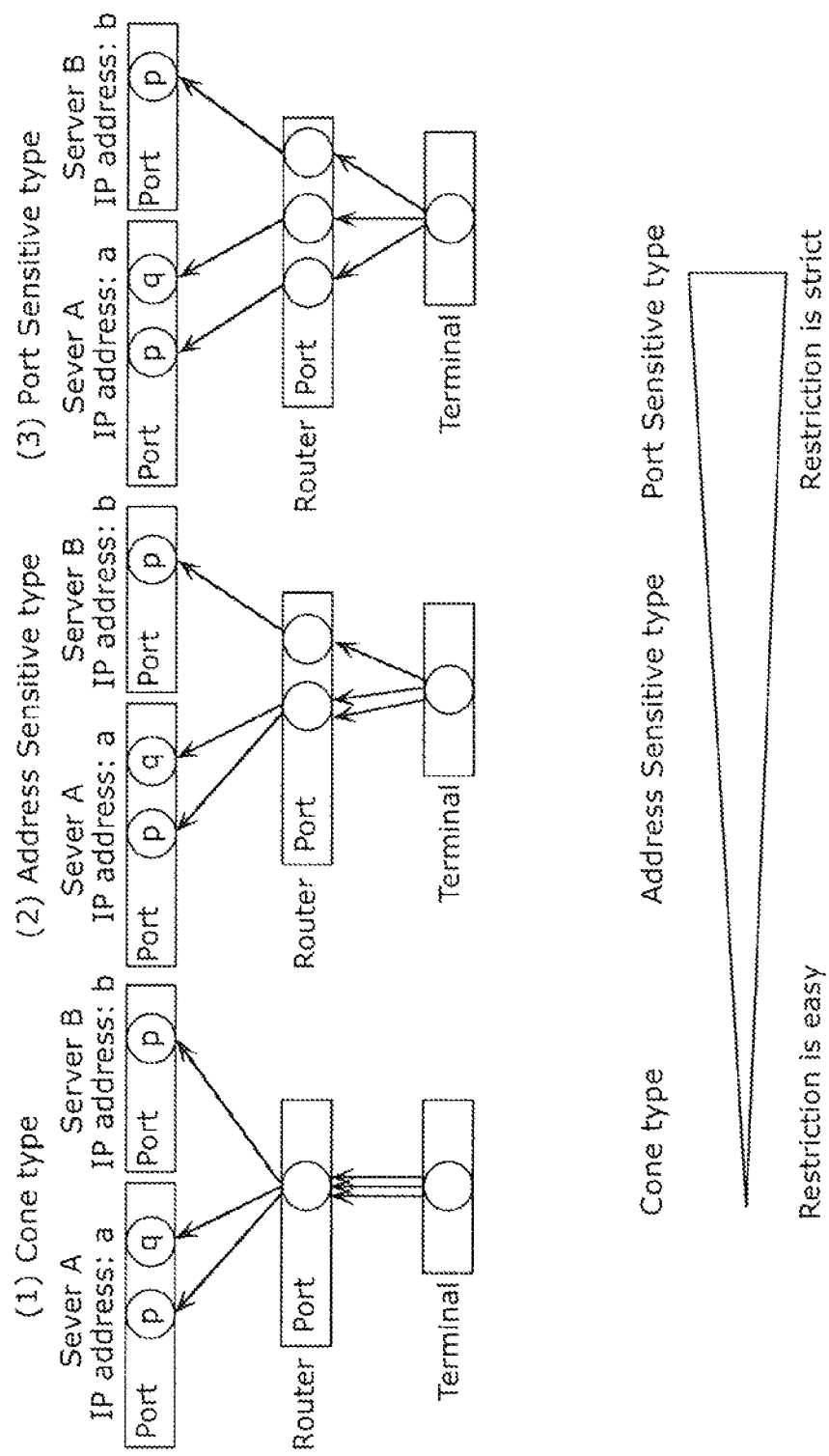
FIG. 2 is a diagram showing a conventional NAT port assignment criterion classification.
Figure 3:
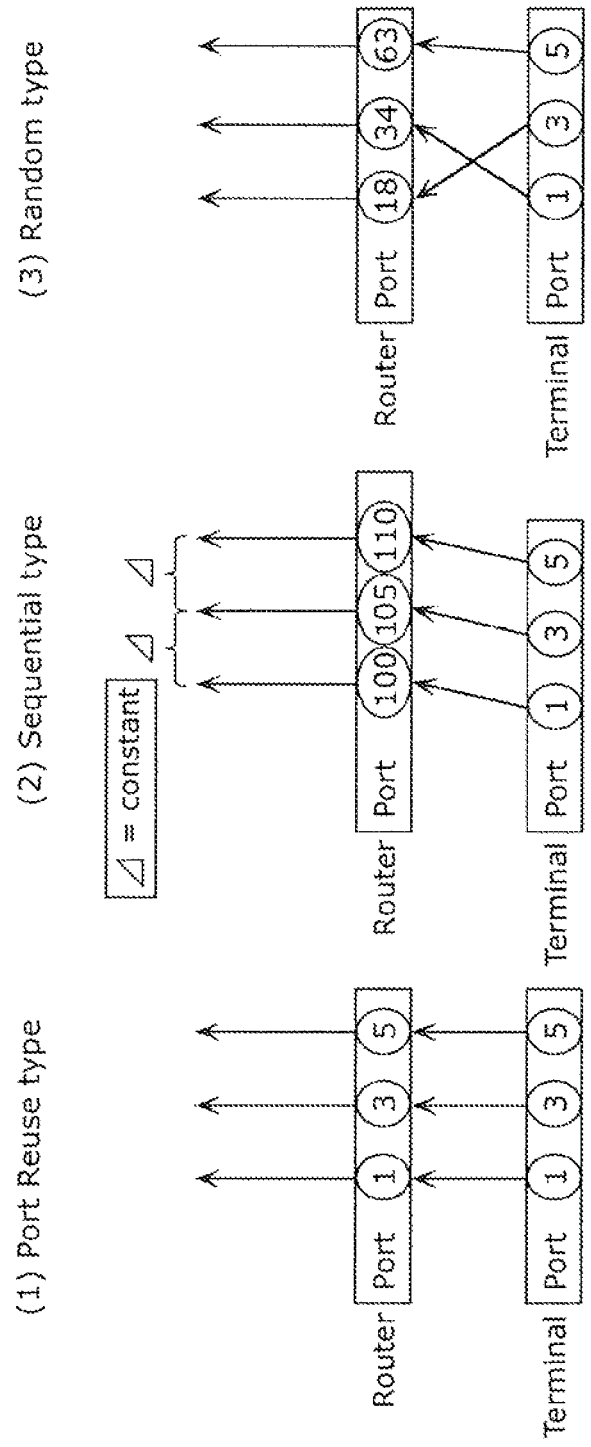
FIG. 3 is a diagram showing a conventional NAT port number issuance rule classification.
Figure 4:
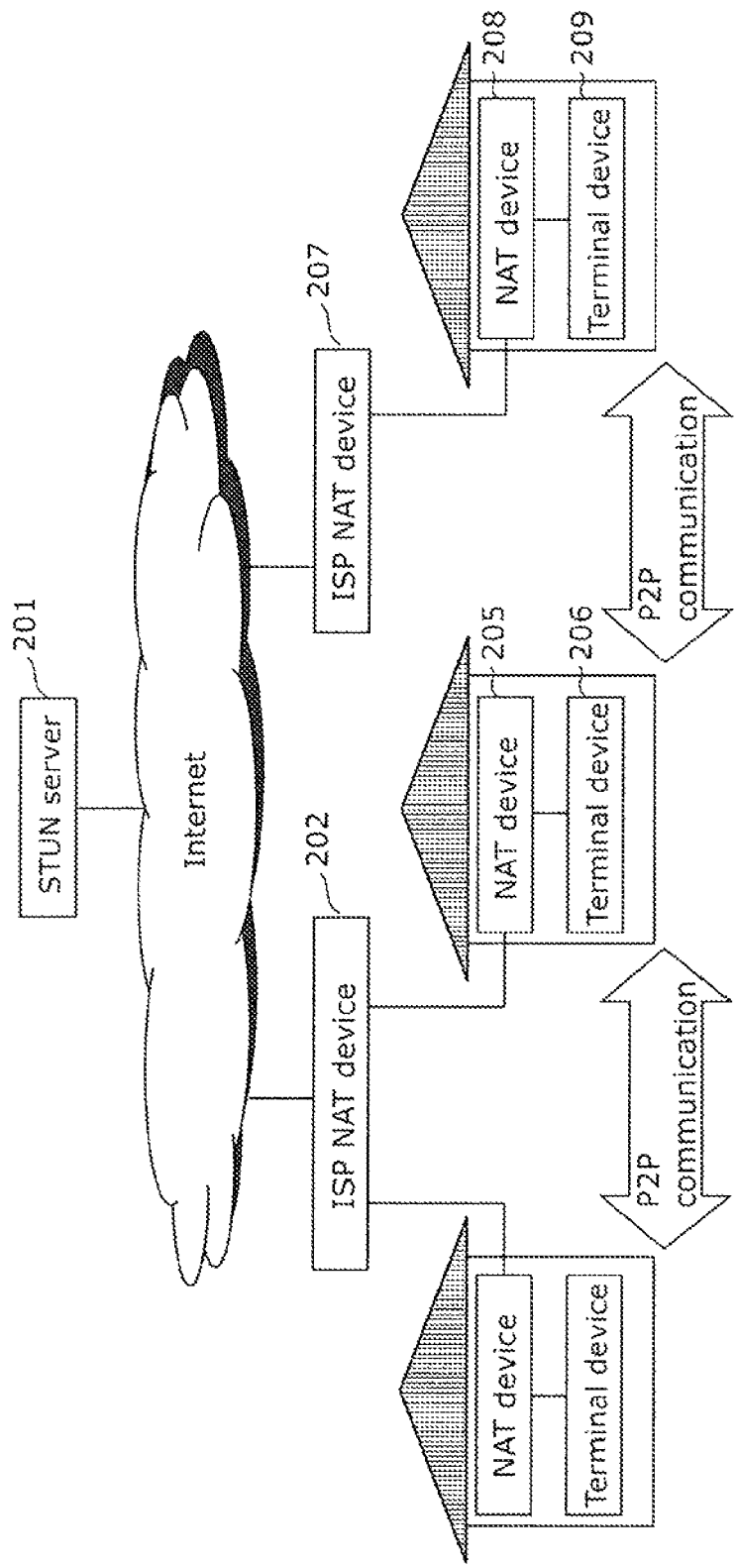
FIG. 4 is a diagram showing an outline of a network configuration predicted in the future.

In other words, the Cone type NAT solidly translates a port number with respect to an upstream packet, and therefore as the whole of the multilayer NAT environment, the Cone type NAT is equal to the NAT restriction of the lower layer NAT device. For example, if the upper layer is a Cone type and the lower layer is a Cone type, the multilayer NAT is also identified as a Cone type ((1) of FIG. 1).

Figure 5:
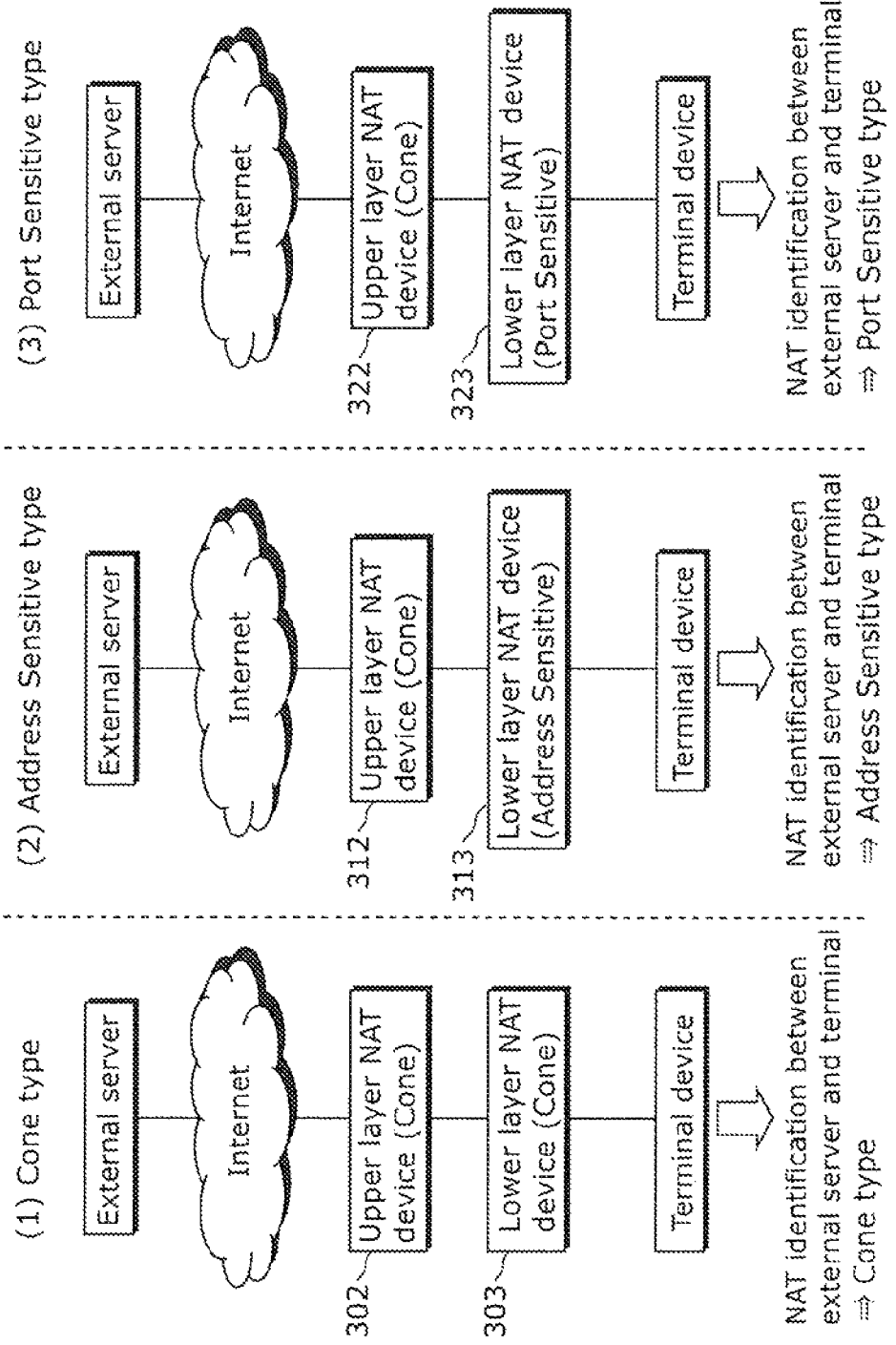
FIG. 5 is a diagram showing an example of an identification result for each of the NAT kinds according to a conventional scheme in a multilayer NAT environment.

If the upper layer is a Cone type and the lower layer is an Address Sensitive type, the multilayer NAT is identified as an Address Sensitive type ((2) of FIG. 5). If the upper layer is a Cone type and the lower layer is a Port Sensitive type, the multilayer NAT is identified as a Port Sensitive type ((3) of FIG. 5).

It should be noted that upper layer NAT devices 302, 312, and 322 in FIG. 5 each correspond to the LSN, and lower layer NAT devices 303, 313, and 323 each correspond to a customer NAT device.

For the above reason, a port assignment criterion for the customer NAT device which is the lower layer NAT device can be easily determined.

The present invention can also be applied to a multilayer NAT environment having three or more layers, but the embodiments will show examples of the NAT device in a multilayer NAT environment having two layers.

Specifically, Embodiment 1 shows an example of communication accompanied by NAT traversal in the case where the customer NAT device which is the lower layer NAT device is a Cone type, and Embodiment 2 shows an example of communication accompanied by NAT traversal in the case where the customer NAT device which is the lower layer NAT device is an Address Sensitive type or a Port Sensitive type.

Each of the embodiments described later shows a favorable specific example of the present invention. The numerical values, the shapes, the structural elements, the arrangement and connection of the structural elements shown in the following embodiments are mere examples, and are not intended to limit the present invention. The present invention is defined by claims. Accordingly, among structural elements in the following embodiments, structural elements which are not described in claim 1 are not necessary to attain the goal of the present invention, but are described as elements constituting a more favorable embodiment.

Embodiment 1

Embodiment 1 shows an example of communication accompanied by NAT traversal in the case where the customer NAT device which is the lower layer NAT device is a Cone type.

First, a configuration of a communication system according to Embodiment 1 will be described.

Figure 6:
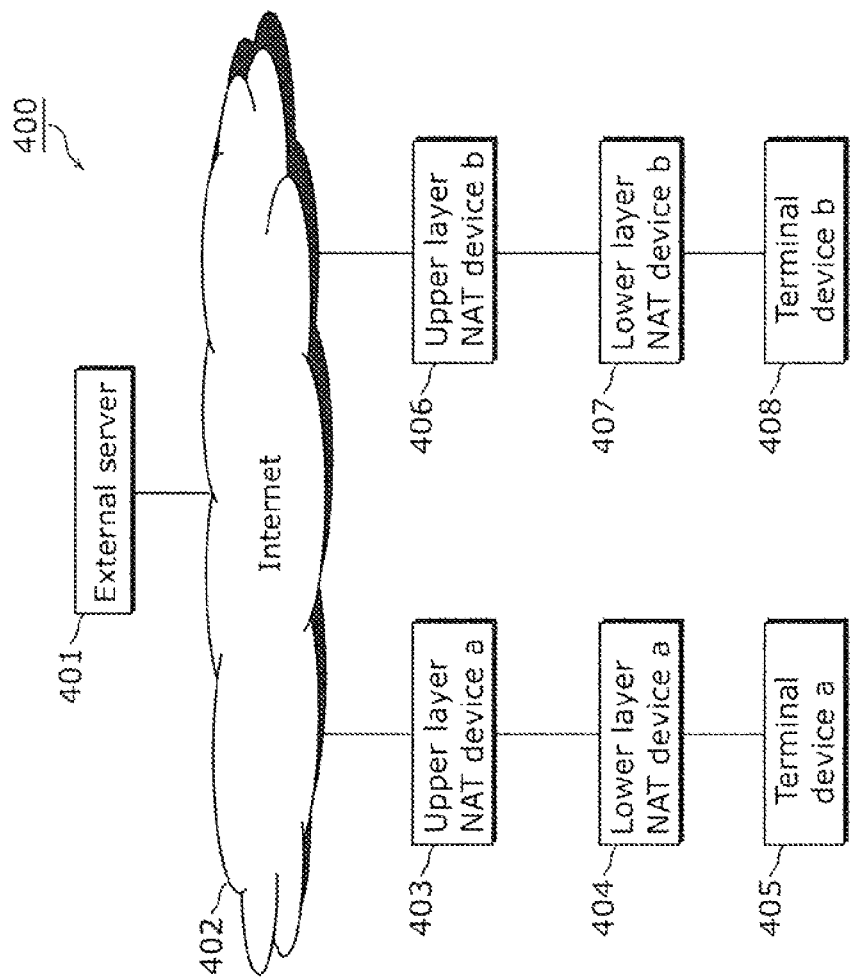
FIG. 6 is a diagram showing an example of a configuration of a communication system according to Embodiment 1 of the present invention.

FIG. 6 is a diagram showing an example of a configuration of the communication system according to Embodiment 1.

A communication system 400 according to Embodiment 1 shown in FIG. 6 includes an external server 401, an upper layer NAT device a 403 and an upper layer NAT device b 406 each of which corresponds to the LSN set up on an ISP level, a lower layer NAT device a 404 and a lower layer NAT device b 407 each of which corresponds to a customer NAT device, and a terminal device a 405 and a terminal device b 408.

Moreover, the external server 401, the upper layer NAT device a 403, and the upper layer NAT device b 406 are connected to an Internet 402 via a communication line.

The present embodiment assumes that communication from the terminal device a 405 to the terminal device b 408 is started such that the terminal device a 405 and the terminal device b 408 perform P2P communication, and then the terminal device a 405 performs a NAT traversal sequence. Specifically, the terminal device a 405 starts communication to the terminal device b 408 via communication with the external server 401.

The external server 401 has a function of receiving, from the terminal device a 405, NAT traversal information such as the WAN-side IP address of the upper layer NAT device a 403 and port information used for NAT traversal by the upper layer NAT device a 403, and a function of notifying, of the NAT traversal information, the terminal device b 408 which is a communication partner of the terminal device a 405.

The Internet 402 is a public communication network or a private communication network using a wired line comprising an optical line, a cable television network, a telephone line, or the like, or a wireless link. Data can be exchanged according to a predetermined communication protocol between terminal devices connected to the Internet 402.

The terminal device a 405 and the terminal device b 408 each have a function of communicating with an IP network with Transmission Control Protocol (TCP) or User Datagram Protocol (UDP), and perform data communication according to each purpose.

Moreover, the terminal device a 405 is an example of a communication device according to the present invention. The terminal device a 405 has a function of obtaining, by transmitting a communication packet to each of the NAT devices, NAT information indicating connection environment of an IP address for each of the NAT devices and the like, a function of setting, on the lower layer NAT device a 404, port mapping for determination with the IGD of UPnP and the like, a function of transmitting a determination packet using a source routing function to the lower layer NAT device a 404 via the upper layer NAT device a 403, a function of receiving the determination packet, a function of setting, based on result information obtained from the determination packet, port mapping on the lower layer NAT device a 404 for the NAT traversal with the IGD of UPnP, and a function of notifying the external server 401 of the NAT traversal information.

It should be noted that "port mapping" is generally called "port forwarding" or the like.

The terminal device b 408 has a function of obtaining, by communicating with the external server 401, NAT traversal information of the terminal device a 405 and a function of accessing the terminal device a 405 based on the obtained NAT traversal information.

A relationship between the functions and the configurations of the terminal device a 405 and the terminal device b 408 will be described later.

The upper layer NAT device a 403, the upper layer NAT device b 406, the lower layer NAT device a 404, and the lower layer NAT device b 407 are routers having NAT functions, have packet routing functions, and constitute parts of a Local Area Network (LAN).

Each of the terminals connected to the LAN has a private IP address and communication between terminals within the same LAN can be performed with their respective private IP addresses.

Next, the hardware configurations of the external server 401, the terminal device a 405, and the terminal device b 408 will be described with reference to FIG. 7.

The external server 401, the terminal device a 405, and the terminal device b 408 can be implemented by an information processing device including a normal hardware configuration which can execute software.

The external server 401, the terminal device a 405, and the terminal device b 408 each include a Central Processing Unit (CPU) 501, a main storage device 502, a communication control device 503, an external storage device 504, an input device 505, and an output device 506.

Each of the devices is mutually connected via a bus 507 and is configured such that necessary information can be transmitted between the devices. It should be noted that the hardware configurations shown in FIG. 7 are examples, and the hardware configurations of the external server 401, the terminal device a 405, and the terminal device b 408 are not necessarily configured as described above.

Figure 8:
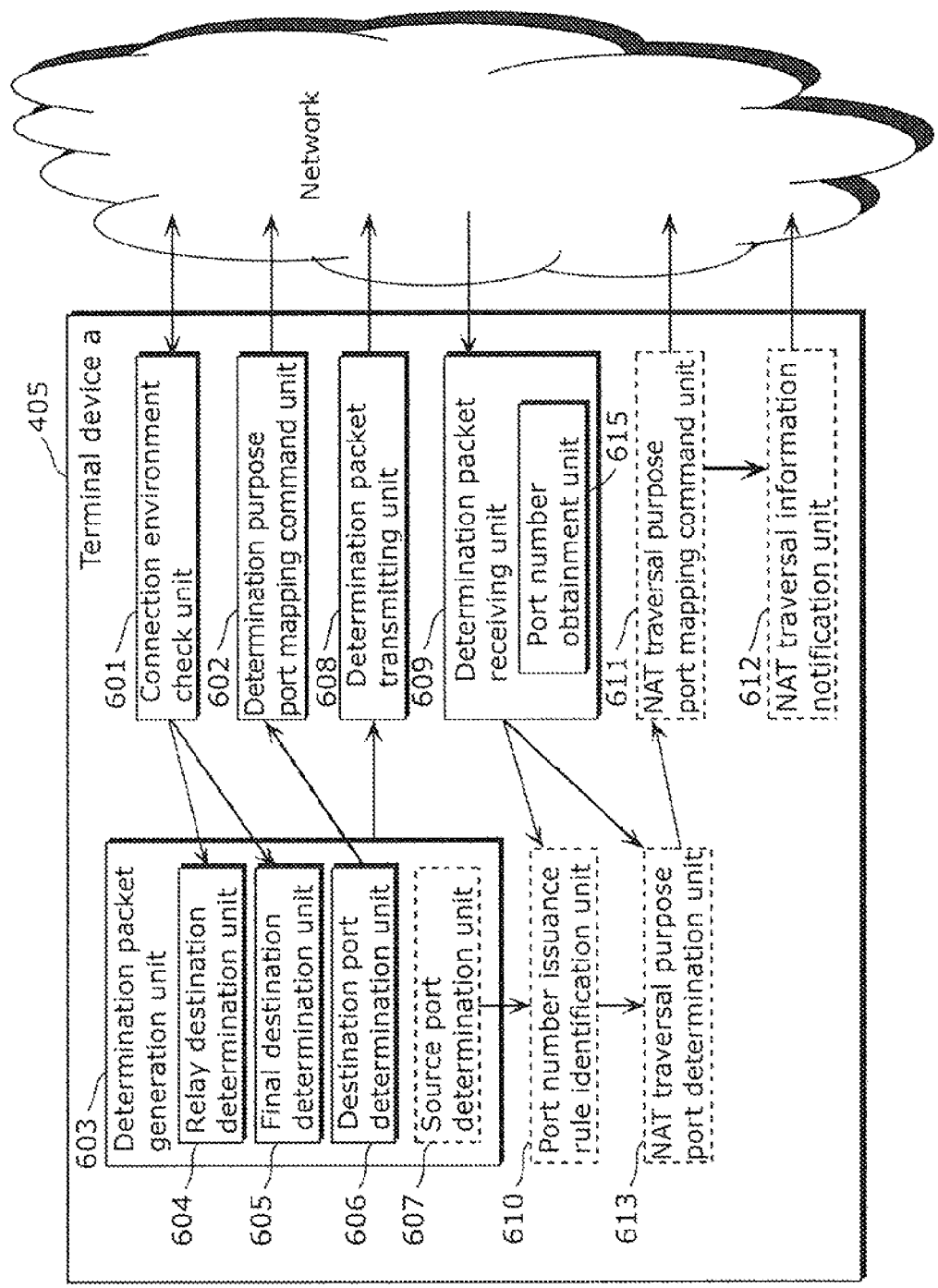
FIG. 8 is a functional block diagram showing an example of a configuration of a terminal device according to Embodiment 1.

FIG. 8 is an example of functional blocks of the terminal device a 405. Each of the functional blocks, for example, is realized by executing, by the CPU 501, a program stored in the main storage device 502 or the external storage device 504 of the terminal device a 405.

A connection environment check unit 601 collects information of all the NAT devices with the NAT functions which exist between the terminal device a 405 and the external server 401. The information obtained here is notified to a determination packet generation unit 603. The information obtained here includes the WAN-side IP address, the LAN-side IP address, and information about the presence or absence of the port mapping setting function such as the IGD of UPnP, NAT-PMP, or the like of the NAT devices each of which exists between the terminal device a 405 and the external server 401.

In other words, information indicating the LAN-side IP address of the upper layer NAT device a 403, information indicating the WAN-side IP address of the lower layer NAT device a 404, the presence or absence information of the port mapping setting function of the upper layer NAT device a 403, and the presence or absence information of the port mapping setting function of the lower layer NAT device a 404, and the like are collected by the connection environment check unit 601.

It should be noted that the pieces of information collected by the above described connection environment check unit 601 are examples, and the pieces of information are not limited to these.

A determination purpose port mapping command unit 602 as issues a port mapping command to the lower layer NAT device a 404 corresponding to the customer NAT device, by using a port number determined by a destination port determination unit 606, with the IGD of UPnP or the like.

In other words, the determination purpose port mapping command unit 602 issues a port mapping command to the lower layer NAT device a 404 such that a packet which arrives at a predetermined port number on the WAN side of the lower layer NAT device a 404 is transferred to the terminal device a 405.

The determination packet generation unit 603 generates a determination packet which is source-routed for being transmitted by a determination packet transmitting unit 608 and being received by a determination packet receiving unit 609.

Specifically, the determination packet generation unit 603 includes: a relay destination determination unit 604 which determines, as a relay destination of a determination packet, the LAN-side IP address of the upper layer NAT device a 403 collected by the connection environment check unit 601; a final destination determination unit 605 which determines, as a final destination of the determination packet, the WAN-side IP address of the lower layer NAT device a 404 collected by the connection environment check unit 601; a destination port determination unit 606 which determines, as a destination port number of the determination packet, the same port number as the predetermined port number used for the port mapping command; and a source port determination unit 607 which determines any source port number.

The determination packet transmitting unit 608 transmits, to a network, the determination packet which is generated by the determination packet generation unit 603 and which is source-routed.

The determination packet receiving unit 609 receives a determination packet which is transmitted from the determination packet transmitting unit 608, passes through the upper layer NAT device a 403 and the lower layer NAT device a 404, and then is sent to the terminal device a 405 itself.

A port number obtainment unit 615 obtains a WAN-side port number of the lower layer NAT device a 404 which is a source port number indicated in a determination packet received by the determination packet receiving unit 609. The WAN-side port number obtained by the port number obtainment unit 615 is notified, as a determination result, to a port number issuance rule identification unit 610.

The port number issuance rule identification unit 610 identifies a port number issuance rule which is a rule for determining a WAN-side port number used for communication in the lower layer NAT device a 404.

Specifically, the determination packet receiving unit 609 receives a plurality of determination packets transmitted by the determination packet transmitting unit 608, and the port number obtainment unit 615 obtains a WAN-side port number of the lower layer NAT device a 404 which is indicated in each of the plurality of the determination packets.

The port number issuance rule identification unit 610 identifies the port number issuance rule of the lower layer NAT device a 404 based on a plurality of the WAN-side port numbers sequentially obtained from the port number obtainment unit 615.

A scheme of identifying a port number issuance rule of the NAT device by the port number issuance rule identification unit 610 will be described with reference to FIG. 14.

The port number issuance rule identification unit 610 notifies a NAT traversal purpose port determination unit 613 of the identified result, and the NAT traversal purpose port determination unit 613 uses the port number indicated by the result for a NAT traversal process.

It should be noted that in the case where it is known in advance that the port assignment criterion of the lower layer NAT device a 404 is a Cone type, there is no need to identify the port number issuance rule for the NAT traversal. Therefore, in this case, a process is shifted to the NAT traversal purpose port determination unit 613 without using a function held by the port number issuance rule identification unit 610.

The NAT traversal purpose port determination unit 613 determines, from a result obtained from the port number issuance rule identification unit 610, a port number used for a port mapping command by the NAT traversal purpose port mapping command unit 611 and a source port number of a notification request packet used by a NAT traversal information notification unit 612.

It should be noted that in the case where it is known in advance that the port assignment criterion of the lower layer NAT device a 404 is a Cone type, as described above, the port number issuance rule identification unit 610 does not identify the port number issuance rule and a source port number of a determination packet received by the determination packet receiving unit 609 is determined as a port number used for a port mapping command.

The NAT traversal purpose port mapping command unit 611 issues, by using a port number which is determined by the NAT traversal purpose port determination unit 613 and which a port mapping should be performed for NAT traversal, a port mapping command to the lower layer NAT device a 404 with the use of the IGD of UPnP or the like.

The NAT traversal information notification unit 612, by using the source port number determined by the NAT traversal purpose port determination unit 613, transmits a notification request packet to the external server 401 and then causes the external server 401 to notify the NAT traversal information to another terminal device communicating with the external server 401.

The NAT traversal information includes the WAN-side IP address and the WAN-side port number of the upper layer NAT device a 403 which are indicated in the notification request packet received by the external server 401. In other words, the NAT traversal information includes information indicating a destination of a packet necessary for the other terminal device to communicate with the terminal device a 405 through performing NAT traversal.

It should be noted that the terminal device a 405 is not required to include functional blocks indicated by dotted-line rectangular boxes in FIG. 8 such as the dotted-line rectangular box of the port number issuance rule identification unit 610. For example, the WAN-side port number of the lower layer NAT device a 404 obtained by the port number obtainment unit 615 of the terminal device a 405 may be transmitted to another device and then the other device may be made to identify the port number issuance rule and to perform such a process as a determination of the NAT traversal purpose port number.

Part or all of the functional configurations shown in FIG. 8 can be implemented as an integrated circuit. In other words, the terminal device a 405 can be implemented by the integrated circuit.

The external server 401 is a communication device which obtains the NAT traversal information from the notification request packet received from the terminal device a 405 and notifies another terminal of the NAT traversal information. The external server 401 can be implemented by an authentication server, a session management server, or the like, used for a conventional NAT traversal scheme, and therefore a functional block diagram is omitted.

The terminal device b 408 has a function of receiving a communication request from the terminal device a 405 via the external server 401, receiving the NAT traversal information for communication with the terminal device a 405 from the external server 401, and accessing the terminal device a 405 based on the information. In other words, the terminal device b 408 is a communication device or a communication means which has a conventional STUN function or a function similar to the conventional STUN function. Therefore, a functional block diagram of the terminal device b 408 is omitted.

Next, a flow of basic processes performed by the terminal device a 405 will be described with reference to FIG. 9.

Figure 9:
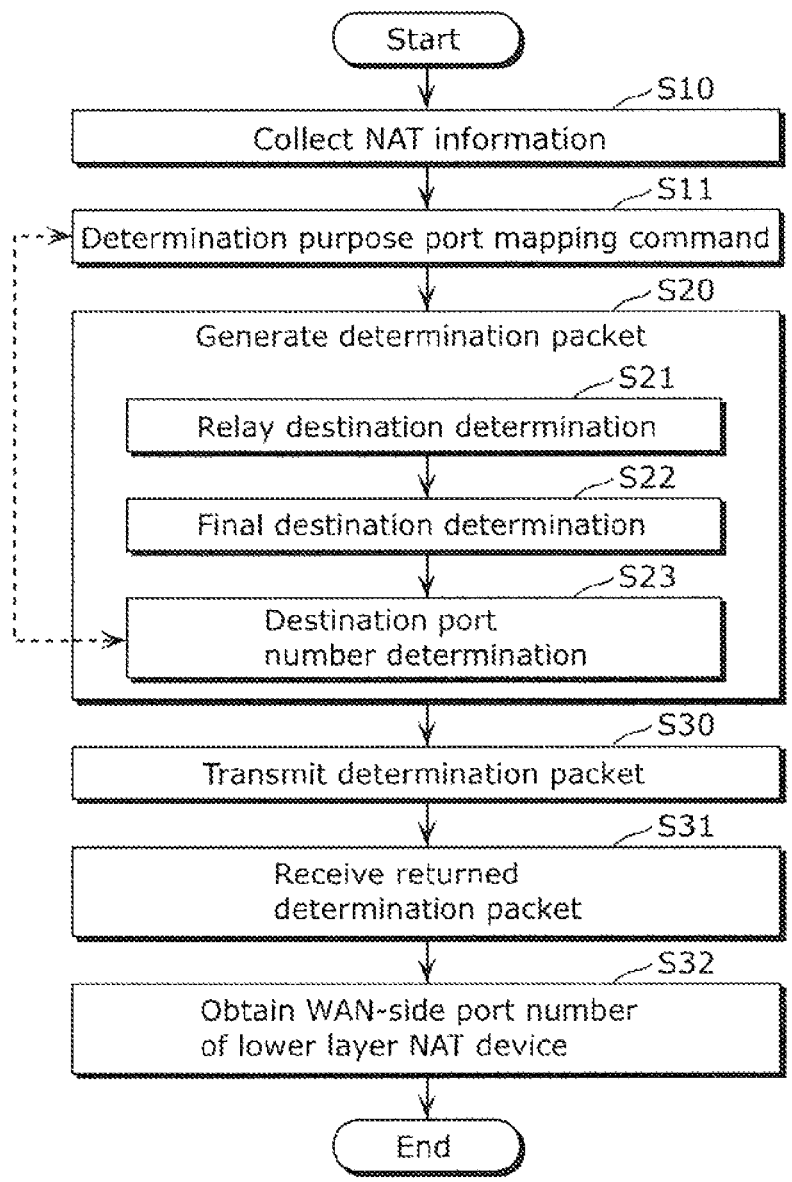
FIG. 9 is a flowchart showing a flow of basic processes performed by the terminal device according to Embodiment 1.

FIG. 9 is a flowchart showing a flow of basic processes performed by the terminal device a 405 according to Embodiment 1 of the present invention.

The connection environment check unit 601 collects NAT information (S10). Specifically, information indicating the LAN-side IP address of the upper layer NAT device a 403, information indicating the WAN-side IP address of the lower layer NAT device a 404, the presence or absence information of the port mapping setting function of the upper layer NAT device a 403, the presence or absence information of the port mapping setting function of the lower layer NAT device a 404, and the like are collected.

The determination purpose port mapping command unit 602 issues, with respect to the lower layer NAT device a 404, a port mapping command with the use of a predetermined port number (S11).

The determination packet generation unit 603 generates the determination packet which is source-routed (S20). Specifically, the following processes are performed.

The relay destination determination unit 604 determines, as the relay destination of the determination packet, the LAN-side IP address of the upper layer NAT device a 403 collected by the connection environment check unit 601 (S21).

The final destination determination unit 605 determines, as the final destination of the determination packet, the WAN-side IP address of the lower layer NAT device a 404 collected by the connection environment check unit 601 (S22).

The destination port determination unit 606 determines, as the destination port number of the determination packet, the same port number as the predetermined port number used for the port mapping command by the determination purpose port mapping command unit 602 (S23).

It should be noted that if the destination port number determined by the destination port determination unit 606 is identical to the predetermined port number used for the port mapping command, the same port number may be determined by one of the destination port determination unit 606 and the determination purpose port mapping command unit 602.

The determination packet transmitting unit 608 transmits the determination packet which is generated by the determination packet generation unit 603 (S30).

The determination packet receiving unit 609 receives the determination packet which is transmitted from the determination packet transmitting unit 608, passes through the upper layer NAT device a 403 and the lower layer NAT device a 404, and then arrives at the terminal device a 405 (S31).

The port number obtainment unit 615 obtains the WAN-side port number of the lower layer NAT device a 404 which is a source port number indicated in the determination packet received by the determination packet receiving unit 609 (S32).

An example of a communication sequence in the communication system 400 including the terminal device a 405 which performs the above described basic processes will be described with reference to FIGS. 10 to 12.

Specifically, by citing the environment of FIG. 10 as an example, a series of processes for establishing P2P communication through NAT traversal from the terminal device a 405 to the terminal device b 408 will be described with reference to FIGS. 11 and 12 which are flowchart diagrams.

Figure 10:
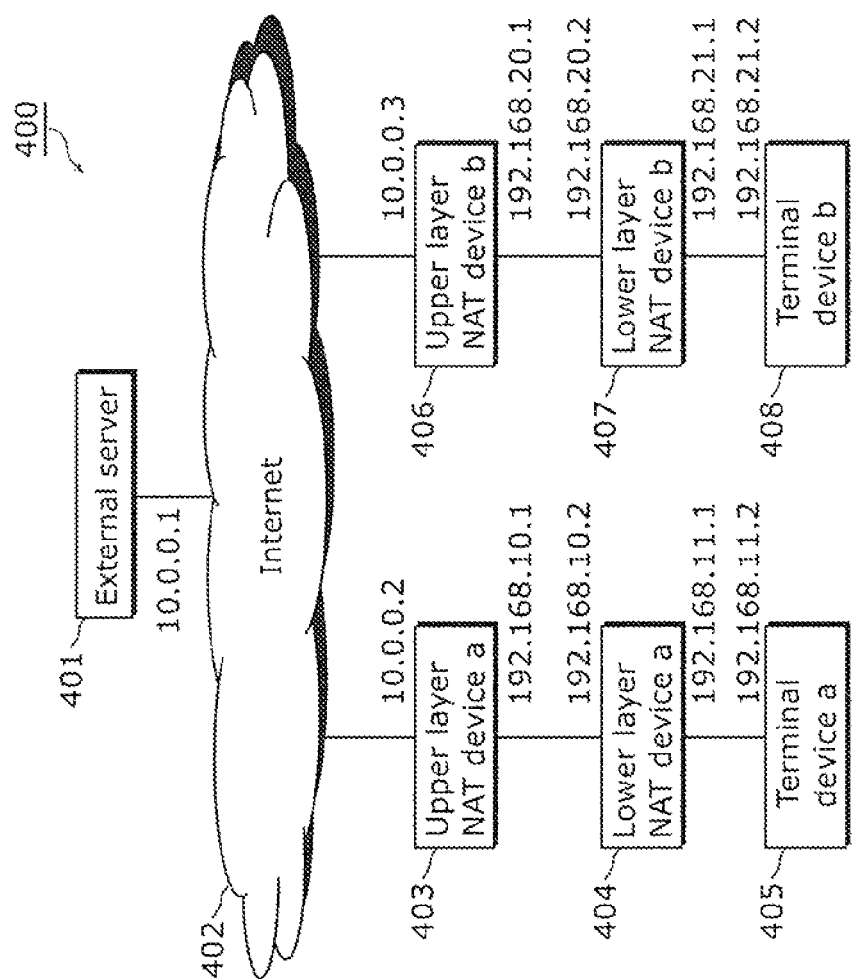
FIG. 10 is a diagram showing an example of an IP address assigned to each of the devices in the communication system according to Embodiment 1.

FIG. 10 is a diagram showing an example of an IP address assigned to each of the devices in the communication system 400 according to Embodiment 1.

As shown in FIG. 10, assume an environment in which one or two IP addresses are assigned to each of the devices. For example, in FIG. 10, to the lower layer NAT device a 404, "192.168.11.1" is assigned as the LAN-side IP address and "192.168.10.2" is assigned as the WAN-side IP address. Moreover, to the upper layer NAT device a 403, "192.168.10.1" is assigned as the LAN-side IP address and "10.0.0.2" is assigned as the WAN-side IP address.

In such an environment, the communication sequence until the terminal device a 405 receives a determination packet which the device itself has generated and transmitted will be described with reference to FIG. 11.

First, the connection environment check unit 601 of the terminal device a 405 obtains NAT information about all the NAT devices existing between the terminal device a 405 and the external server 401 (S801). The NAT information obtained by the connection environment check unit 601 is information indicating the WAN-side IP address, information indicating the LAN-side IP address, and information indicating the presence or absence of a port mapping setting function such as the IGD of UPnP or NAT-PMP for each of the NAT devices (403 and 404 in the present embodiment). The connection environment check unit 601 may obtain other pieces of information.

Moreover, the WAN-side IP address and the LAN-side IP address of the NAT device can be obtained by using an Internet Control Message Packet (ICMP) packet such as traceroute, GetExternalIPAddress of UPnP, or the like. Moreover, the presence or absence of the port mapping setting function such as the IGD of UPnP, NAT-PMP, or the like can be determined by using the function of the IGD of UPnP or the like.

It should be noted that the process of S801 may be performed when the terminal device a 405 is connected to a network or a power source is started, which means that any time is acceptable as long as S801 can be performed before S802 is performed.

Next, the determination purpose port mapping command unit 602 of the terminal device a 405 issues, to the lower layer NAT device a 404, a port mapping command using the predetermined port number determined by the destination port determination unit 606 in the terminal device a 405 by using the port mapping setting function such as the IGD of UPnP or the like (S802).

In the present embodiment, the predetermined port number determined by the destination port determination unit 606 of the terminal device a 405 is described as a number d later.

On the receiving of the determination purpose port mapping command from the terminal device a 405, the lower layer NAT device a 404 performs, by using the IGD of UPnP or the like, a port mapping setting with respect to the number d port which is the designated port. With this, hereafter, in the case where a packet comes from the WAN side to a number d port of "192.168.10.2" which is the WAN-side IP address of the lower layer NAT device a 404, the lower layer NAT device a 404 transfers the packet to the terminal device a 405 by rewriting the destination of the packet into the number d port of "192.168.11.2" which is the IP address of the terminal device a 405 (S803 and S804).

It should be noted that in the packet transfer to the terminal device a 405, the destination port number may be designated to be transferred to a port other than the number d.

The determination packet generation unit 603 of the terminal device a 405 generates a determination packet based on the NAT information obtained in S801 (S805).

Here, the determination packet is source-routed, and therefore not only the destination IP address and the source IP address in the normal IP packet but also the final destination IP address are included in the determination packet. In other words, the IP address designated by the destination IP address unit in the normal IP header unit is treated as a relay destination IP address. Therefore, hereafter, the IP address designated by the destination IP address unit in the IP header unit in the generation of the determination packet is expressed as the relay destination IP address.

Under the environment example shown in FIG. 10, the relay destination determination unit 604 of the terminal device a 405 designates, as the relay destination IP address, "192.168.10.1" which is the LAN-side IP address of the upper layer NAT device a 403. Moreover, the final destination determination unit 605 designates, as the final destination IP address, "192.168.10.2" which is the WAN-side IP address of the lower layer NAT device a 404.

Among broadband NAT devices that are commercially available, there is a product which performs a filtering of a communication packet including the final destination IP address for source routing designated by an option unit of an IP header. Therefore, the present invention makes it possible to perform a function similar to the source routing not by designating the final destination IP address in the option unit of the IP header but by designating the final destination IP in address in other than the IP header such as a data unit of a communication packet.

Moreover, the destination port determination unit 606 of the terminal device a 405 designates the destination port number of the determination packet. In the present embodiment, as described above, the number d is designated. Furthermore, the source port determination unit 607 of the terminal device a 405 designates any port number as the source port number of the determination packet. The present embodiment assumes that the number s port is used as the source number port number.

Then, the determination packet transmitting unit 608 of the terminal device a 405 transmits the determination packet which is generated in S805. The transmitted determination packet passes through the lower layer NAT device a 404 and is received by the upper layer NAT device a 403 designated by the relay destination IP address (S806, S807, and S808).

At this time, in S807, the lower layer NAT device a 404 performs address translations of the source IP address and the source port number of the determination packet. In the address translation at this time, the source IP address is translated from "192.168.11.2" to "192.168.10.2" which is the WAN-side IP address of the lower layer NAT device a 404. Moreover, assume that the source port number is translated from the number s to the number s'.

The upper layer NAT device a 403 translates from the relay destination IP address of the destination IP address unit in the IP header unit of the determination packet received in S808 to the final destination IP address written in the determination packet (S809).

The upper layer NAT device a 403 transmits the determination packet whose destination is changed in S809 to the number d port of the lower layer NAT device a 404 in which port mapping is performed in S804 (S810).

The lower layer NAT device a 404 translates the destination IP address of the determination packet transmitted from the upper layer NAT device a 403 in S810 to the IP address of "192.168.11.2" of the terminal device a 405 and then transfers the destination IP address (S811).

It should be noted that after S810 and S811 are completed, in S802, S803, and S804, a process may be performed for stopping the port mapping function which is set for the lower layer NAT device a 404 with the IGD of UPnP or the like.

The determination packet receiving unit 609 of the terminal device a 405 receives the determination packet which is transmitted and transferred in S810 and S811 (S812). The source IP address and the source port number of the determination packet received here are "192.168.10.2" which is the WAN-side IP address of the lower layer NAT device a 404 and "s'" which is the port number as a result of the address translation in S807 by the lower layer NAT device a 404, respectively.

The port number obtainment unit 615 of the terminal device a 405 obtains "s'" which is the WAN-side port number of the lower layer NAT device a 404 which is the source port number of the determination packet received by the determination packet receiving unit 609.

Next, a flow of processes performed by each of the devices from the determination of the port for NAT traversal to the NAT traversal access by the terminal device a 405 will be described with reference to FIG. 12.

Figure 12:
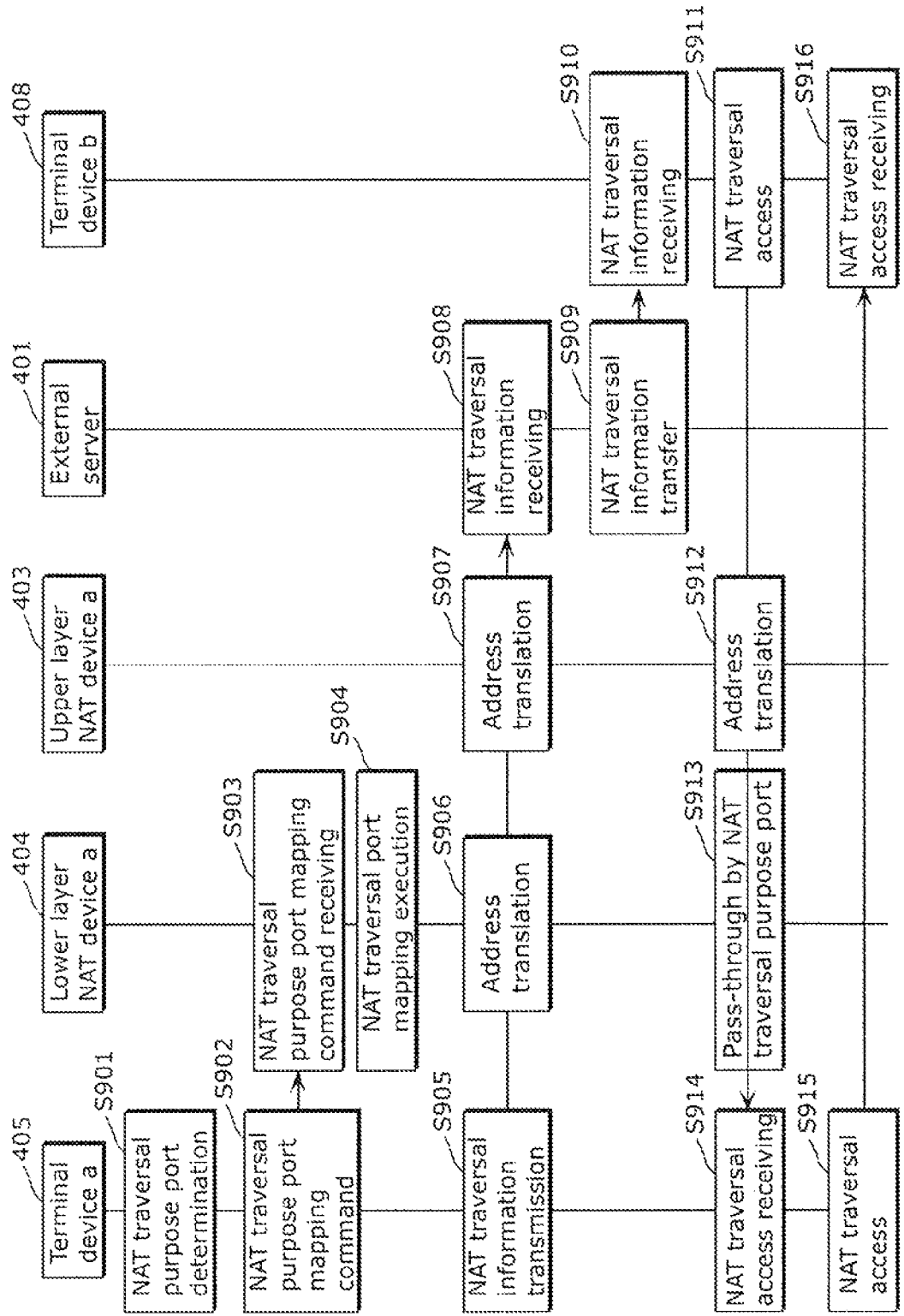
FIG. 12 is a diagram showing an example of a communication sequence including NAT traversal according to Embodiment 1.

Here, the present embodiment assumes that a port assignment criterion of the lower layer NAT device a 404 is a Cone type, and in this case, the identification of the port number issuance rule is not required for the determination of the port for the NAT traversal necessary in S901 in FIG. 12.

Therefore, as a flow of processes performed by each of the functional blocks of the terminal device a 405, the process is shifted from the determination packet receiving unit 609 to the NAT traversal purpose port determination unit 613.

The NAT traversal purpose port determination unit 613 of the terminal device a 405 determines the NAT traversal purpose port number used for issuing, in, S902, a port mapping command with the IGD of UPnP or the like to the lower layer NAT device a 404 and the source port number of the notification request packet of the NAT traversal information used in S905 (S901).

Here, as described above, the port assignment criterion of the lower layer NAT device a 404 according to the present embodiment is a Cone type. Therefore, the port number determined for the NAT traversal and the source port number of the notification request packet of the NAT traversal information are the number s' port which is the source port number of the determination packet received in S812 and the source port number s used in S806, respectively.

Therefore, the NAT traversal purpose port mapping command as unit 611 of the terminal device a 405 transmits the port mapping command of the number s' port to the lower layer NAT device a 404 with the use of the IGD of UPnP or the like (S902).

The lower layer NAT device a 404 receives the NAT purpose port mapping command transmitted in S902 (S903) and performs a port mapping setting with respect to the designated number s' port (S904). Hereafter, in the case where a packet comes from the WAN side to the number s' port of "192.168.10.2" which is the WAN-side IP address of the lower layer NAT device a 404, the lower layer NAT device a 404 transfers the packet to the terminal device a 405 by rewriting the packet destination into the number s port of "192.168.11.2" which is the IP address of the terminal device a 405.

The NAT traversal information notification unit 612 of the terminal device a 405 transmits, by designating the source IP address as "192.168.11.2" and the source port as the number s port, a notification request packet to the external server 401.

Specifically, "10.0.0.1" is designated as the destination IP address of the notification request packet, and any port number designated by the external server 401 is designated as the destination port number. In this way, the NAT traversal information is transmitted to the external server 401 (S905).

At this time, address translation is performed in the lower layer NAT device a 404, but the lower layer NAT device a 404 is a Cone type and the source port number of the notification request packet from the terminal device a 405 is "s", which is the same as the source port number when the determination packet is transmitted (S806).

Therefore, the source IP address and the source port are translated into "192.168.10.2" and the number s' port which is a translation result in S807, respectively (S906).

Furthermore, address translation is performed also in the upper layer NAT device a 403 (S907). The source IP address after the translation at this time is "10.0.0.2". Moreover, the source port after the translation is determined as the number s" port.

The source IP address and the source port number of the communication packet which arrive at the external server 401 in S908 are "10.0.0.2" and "s''" which are the results of the address translations by the upper layer NAT device a 403, respectively. The external server 401 stores these pieces of information as the NAT traversal information in the external server 401 (S908).

Moreover, the notification request packet to be transmitted from the terminal device a 405 in S905 may be sent by the inclusion of an identifier, identification, or the like of the terminal device b 408 which is a communication partner of the terminal device a 405. In other words, the terminal device a 405 can notify the external server 401 of the identifier or the like of the communication partner.

The external server 401 which has completed the process of S908 notifies, of the NAT traversal information obtained in S908, the terminal device b 408 which is a communication partner of the terminal device a 405 (S909 and S910).

The information notified at this time includes "10.0.0.2" which is the WAN-side IP address of the upper layer NAT device a 403 and the port number "s''", but may include pieces of information other than these.

The terminal device b 408 traverses NAT and accesses the terminal device a 405 with the use of the NAT traversal information received from the external server 401 in S910 (S911).

The destination IP address and the destination port number of the communication packet at this time are "10.0.0.2" which is the WAN-side IP address of the upper layer NAT device a 403 which is indicated in the NAT traversal information obtained in S910 and the port number "s''" after the address translation performed by the upper layer NAT device a 403 in communication between the terminal device a 405 and the external server 401, respectively.

In the case where the terminal device b 408 transmits the communication packet, the upper layer NAT device a 403 rewrites the destination IP address and the destination port number of the communication packet into "192.168.10.2" and "s'", respectively, and transfers the rewritten packet to the lower layer NAT device a 404 (S912).

In other words, the lower layer NAT device a 404 receives the communication packet at the number s' port which is a port in which port mapping settings are performed in S903 and S904. Therefore, the lower layer NAT device a 404 rewrites the destination IP address and the destination port number of the communication packet into "192.168.11.2" of the IP address of the terminal device a 405 and "s" and transfers the rewritten packet to the terminal device a 405 (S913).

In this way, the terminal device a 405 receives the communication packet which has performed NAT traversal from the terminal device b 408 (S914).

The terminal device a 405 replies to the communication packet received in S914. With this, the NAT traversal from the terminal device a 405 to the terminal device b 408 is performed and thus P2P communication is established (S915 and S916).

By the flow of the above processes, in the network configuration illustrated in FIG. 10, in the case where the port assignment classification of the lower layer NAT device a 404 is a Cone type, the communication packet from the terminal device b 408 to the terminal device a 405 arrives at a port which is set as a NAT traversal purpose port provided at the lower layer NAT device a 404. With this, the communication packet passes through the lower layer NAT device a 404 and arrives at the terminal device a 405. In other words, the NAT traversal is performed in communication from the terminal device b 408 to the terminal device a 405.

Moreover, the communication packet from the terminal device a 405 to the terminal device b 408, as a reply of the communication packet from the above described terminal device b 408 to the terminal device a 405, is transmitted to the upper layer NAT device b 406 and the lower layer NAT device b 407 with the use of the same path (port number). Therefore, filtering is not performed for the communication packet of the reply by the two NAT devices. In other words, the NAT traversal is performed in communication from the terminal device a 405 to the terminal device b 408, and thus the communication from the terminal device a 405 to the terminal device b 408 can be realized.

Embodiment 2

Embodiment 2 shows an example of communication accompanied by NAT traversal in the case where the customer NAT device which is the lower layer NAT device is an Address Sensitive type or a Port Sensitive type.

Figure 7:
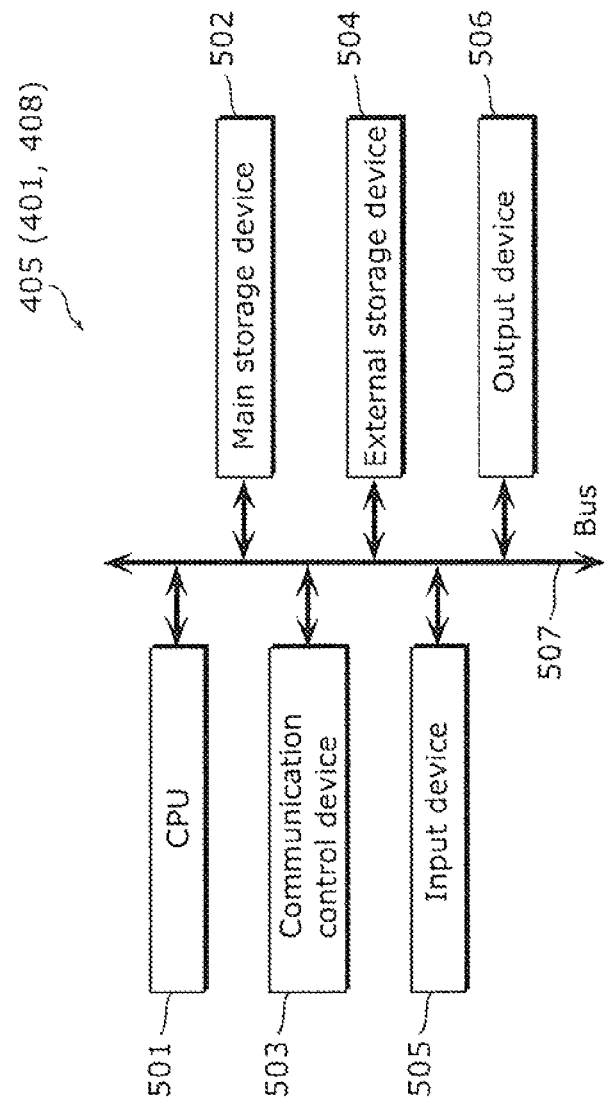
FIG. 7 is a block diagram showing an example of hardware configurations of an external server and terminal devices according to Embodiment 1 of the present invention.

A configuration of a communication system, and a hardware configuration for each of the devices and a functional block configuration according to Embodiment 2 are the same as those in FIGS. 6, 7 and 8 of Embodiment 1, and therefore their descriptions are omitted here.

Moreover, a flow of basic processes performed by a terminal device a 405 according to Embodiment 2 is the same as that in FIG. 9, and therefore the description is omitted here.

Hereafter, descriptions will be made for each of the devices in the case where NAT traversal and P2P communication are performed between the terminal device a 405 and the terminal device b 408 under control of different NAT devices under the multilayer NAT environment.

Specifically, as similarly to Embodiment 1, in the environment exemplified in FIG. 10, the flow of processes for, performing NAT traversal from the terminal device a 405 to the terminal device b 408 and P2P communication will be described with reference to FIGS. 11 and 13.

First, the connection environment check unit 601 of the terminal device a 405 obtains the NAT information about all the NAT devices existing between the terminal device a 405 and the external server 401 (S801). The NAT information obtained by the connection environment check unit 601 is information indicating the WAN-side IP addresses, the LAN-side IP addresses, and the presence or absence of a port mapping setting function such as the IGD of UPnP, NAT-PMP, or the like of the NAT devices (403 and 404 in the present embodiment). The connection environment check unit 601 may obtain other pieces of information.

Moreover, the WAN-side IP address and the LAN-side IP address of the NAT device can be obtained by using an ICMP packet such as traceroute, or GetExternalIPAddress of UPnP or the like. Moreover, the presence or absence of the port mapping setting function such as the IGD of UPnP or NAT-PMP can be determined by using the function of the IGD of UPnP or the like.

Figure 11:
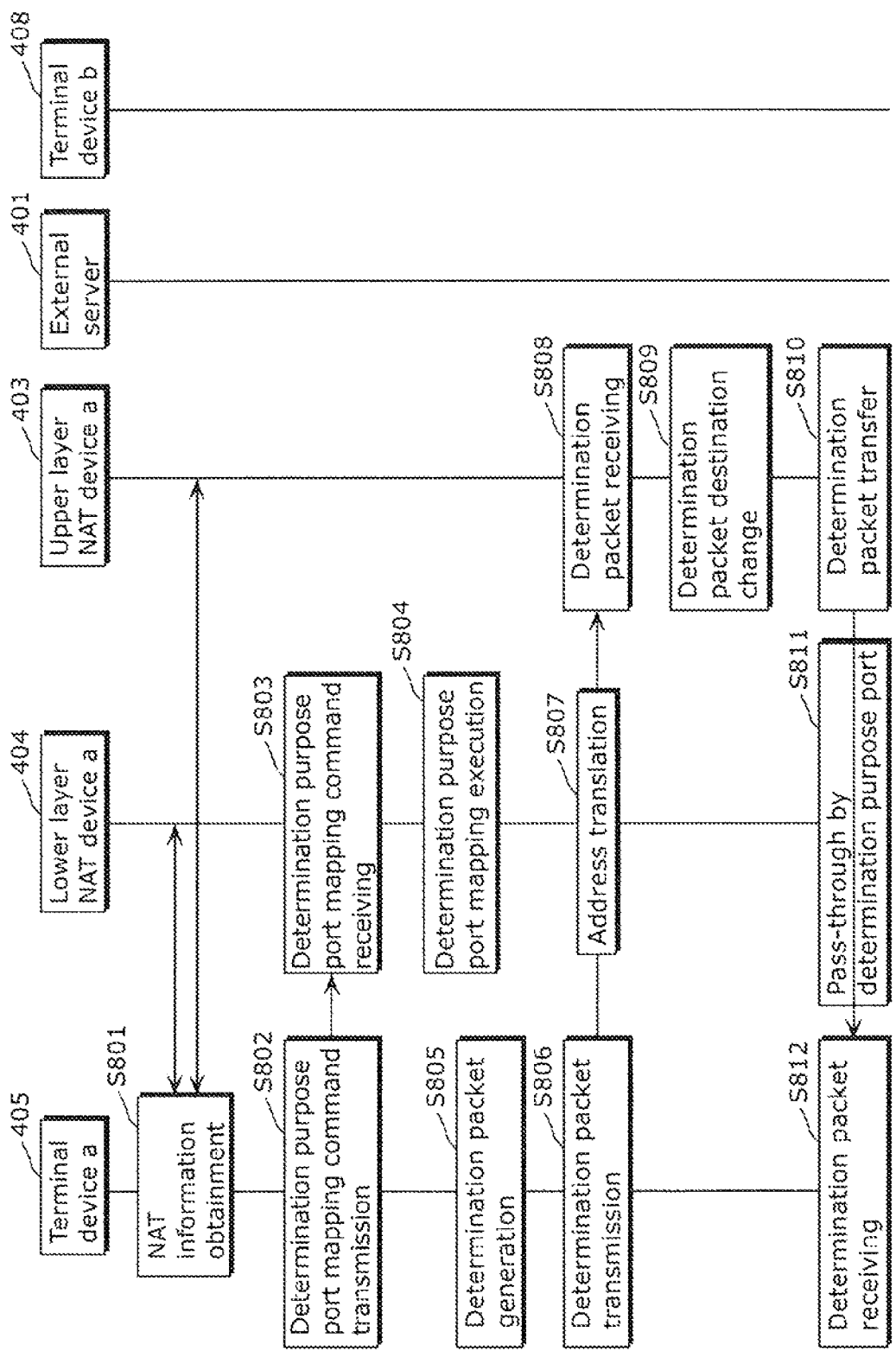
FIG. 11 is a diagram showing an example of a communication sequence for obtaining the WAN-side port number used by a lower layer NAT device according to Embodiments 1 and 2.

In the present embodiment, after S801 is performed, S802 to S812 in FIG. 11 are performed as similarly to Embodiment 1. In the present embodiment, however, it is necessary to identify the port number issuance rule of the lower layer NAT device a 404. Therefore, specifically, a series of processes of S802 to S812 in FIG. 11 needs to be performed at least three times.

As a result, in the present embodiment, the series of processes of S802 to S812 in FIG. 11 are performed three times. Moreover, in the performing of S802 to S812, an item which needs to be varied every time is a source port number which is set in the generation of a determination packet of S805.

In the present embodiment, a port which is used in an n-th S802 to S812 as a source port number of a determination packet by the terminal device a 405 is represented as the number s(n) port, and a port which is a result of translation of the number s(n) port by the lower layer NAT device a 404 in S807 is represented as the number s'(n) port.

In other words, the determination packet used in the first S802 to S812, when transmitted from the terminal device a 405, uses the number s(1) port as the source port, and in the lower layer NAT device a 404, address translation is performed from the number s(1) port to the number s'(1) port.

After the series of processes of S802 to S812 is performed three times, the port number issuance rule identification unit 610 of the terminal device a 405 performs the identification of the port number issuance rule of the lower layer NAT device a 404, for example, according to a process flow as shown in FIG. 14 (S1001 in FIG. 13) by using s(1), s(2), and s(3) each of which is used as the source port number of the determination packet used every time and s'(1), s'(2), and s'(3) each of which is a port number obtained as a translation result.

Here, in the identification process of the port number issuance rule shown in FIG. 14, the port number issuance rule identification unit 610 compares s(n) with s'(n) (S1101). As a result of the comparison, in the case where s(n) is equal to s'(n) (Y in S1101), the port number issuance rule identification unit 610 identifies that the port number issuance rule of the lower layer NAT device a 404 is (1) a Port Reuse type, and in the case where s(n) is different from s'(n), the port number issuance rule identification unit 610 is shifted to the next comparison process (S1102).

In other words, in the present embodiment, in the case of "s(1)=s'(1)" and "s(2)=s'(2)" and "s(3)=s'(3)", the port number issuance rule is identified as [1] the Port Reuse type.

In the next comparison process (S1102), in the case where s'(n)−s'(n−1) is constant, the port number issuance rule identification unit 610 identifies that the port number issuance rule is [2] a Sequential type and identifies that the port number issuance rule is [3] a Random type in the case of being not constant.

In other words, the port number issuance rule identification unit 610 identifies that the port number issuance rule is [2] the Sequential type in the case of "s'(3)−s'(2)=s'(2)−s'(1)", that is, in the case where a port assignment interval is constant, and identifies that the port number issuance rule is [3] the Random type in case of others.

It should be noted that in the case where the port number issuance rule of the lower layer NAT device a 404 is identified as [3] the Random type, the NAT traversal scheme proposed by the present invention cannot be performed. Therefore, in the case of being identified as [3] the Random type, the terminal device a 405 may not notify the external server 401, for example, that NAT traversal is impossible. Moreover, the external server 401 may notify the terminal device b 408 of the notification content.

Here, the NAT devices of [1] the Port Reuse type and [2] the Sequential type each determine a port number in which a port mapping setting is performed according to the port number issuance rule. Therefore, in the case where the determined port number is already used for another communication, a port number violating the original port number issuance rule is sometimes assigned. Consequently, depending on a situation, a wrong port number issuance rule is identified for each of the NAT devices which are originally [1] the Port Reuse type and [2] the Sequential type, but description of how to deal with this case is omitted because it is not the significance of the present invention.

S1002 to S1017 shown in FIG. 13 are almost the same as S901 to S916 according to Embodiment 1, but there are differences in the used source port number, the address translation in the lower layer NAT device a 404, and the like. Therefore, a specific example 1 of Embodiment 2 is set for the case where the lower layer NAT device a 404 is [1] the Port Reuse type, and a specific example 2 of Embodiment 2 is set for the case where the lower layer NAT device a 404 is [2] the Sequential type, and descriptions of S1002 to S1017 will be shown below.

Specific Example 1 of Embodiment 2

Port Reuse Type

After the port number issuance rule identification unit 610 of the terminal device a 405 identifies that the port number issuance rule of the lower layer NAT device a 404 is the Port Reuse type, the NAT traversal purpose port determination unit 613 determines a port number in which a port mapping setting for the NAT traversal is performed for the lower layer NAT device a 404 (S1002).

Here, the port number which is the target of the port mapping when the lower layer NAT device a 404 is the Port Reuse type is a port number which is assigned to the lower layer NAT device a 404 after the address translation and is the same port number as the source port number used by the terminal device a 405 when the NAT traversal information is transmitted in S1006.

The source port number used by the terminal device a 405 when transmitting the NAT traversal information in S1006 may be any number. But the port numbers s(1), s(2), and s(3) used in S802 to S812 should be avoided because they are the numbers used immediately before and therefore there is a possibility that the lower layer NAT device a 404 will issue a port number in violation of the Port Reuse rule that is an original port number issuance rule.

Here, for the following description, the port number which is used by the terminal device a 405 as the source port number of the notification request packet when transmitting the NAT traversal information in S1006 is represented as "s_pr". In this case, the port number in which a port mapping setting is performed for NAT traversal is also "s_pr".

By using the NAT traversal purpose port number "s_pr" which is determined in S1002, a port mapping command is issued from the NAT traversal purpose port mapping command unit 611 of the terminal device a 405 to the lower layer NAT device a 404 with the IGD of UPnP or the like. The lower layer NAT device a 404 performs a port mapping setting for the number s_pr port according to the command (S1003, S1004, and S1005).

Hereafter, in the case where a packet comes from the WAN side to the number s_pr port of "192.168.10.2" which is the WAN-side IP address of the lower layer NAT device a 404, the lower layer NAT device a 404 transfers the packet to the terminal device a 405 by translating the packet destination into the number s_pr port of "192.168.11.2" which is the IP address of the terminal device a 405. It should be noted that in the packet transfer to the terminal device a 405, a port other than the number s_pr may be designated as the destination port.

Next, the NAT traversal information is notified from the NAT traversal information notification unit 612 of the terminal device a 405 to the external server 401 (S1006). Specifically, the following as processes are performed. In other words, the NAT traversal information notification unit 612 transmits, to the external server 401, the notification request packet in which the source IP address and the source port number are determined as "192.168.11.2" and "s_pr," respectively. The destination IP address of the notification request packet is "10.0.0.1" and the destination port number is any port number designated by the external server 401.

In this case, the source IP address and the source port number of the notification request packet after the address translation in the lower layer NAT device a 404 are "192.168.10.2" and "s_pr", respectively (S1007). Furthermore, address translation is performed also in the upper layer NAT device a 403 (S1008). The source IP address after the translation is "10.0.0.2". Moreover, the source port after the translation at this time is designated as the number s"_pr port.

The source IP address and the source port number of the communication request packet which arrives at the external server 401 are "10.0.0.2" and "s"_pr", respectively, which are obtained by the address translation by the upper layer NAT device a 403. These pieces of information are stored as the NAT traversal information in the external server 401 (S1009).

Moreover, at this time, the notification request packet to be transmitted from the terminal device a 405 may be sent by the inclusion of an identifier, identification, or the like of the terminal device b 408 which is a communication partner of the terminal device a 405.

The external server 401 which has completed the process of S1009 notifies, of the NAT traversal information, the terminal device b 408 which is a communication partner of the terminal device a 405 (S1010 and S1011).

The information notified at this time includes "10.0.0.2" which is the WAN-side IP address of the upper layer NAT device a 403 and the port number "s"_pr" after the address translation by the upper layer NAT device a 403, but may include pieces of information other than these.

The terminal device b 408 traverses NAT and accesses the terminal device a 405 with the use of the NAT traversal information notified from the external server 401 (S1012).

The destination IP address and the destination port number of the communication packet at this time are "10.0.0.2" which is the WAN-side IP address of the upper layer NAT device a 403 and "s"_pr" which is a port number after the address translation performed by the upper layer NAT device a 403 in communication between the terminal device a 405 and the external server 401.

On the receiving of the communication packet, the upper layer NAT device a 403 rewrites the destination IP address and the destination port number into "192.168.10.2" and "s_pr", respectively, and then transfers the packet to the lower layer NAT device a 404 (S1013).

In this case, the lower layer NAT device a 404 receives the communication packet which designates, as the destination, the WAN-side IP address itself and the number s_pr port in which a port mapping setting is provided in S1004 and S1005. Therefore, the lower layer NAT device a 404 rewrites the destination IP address and the destination port number of the communication packet into "192.168.11.2" of the IP address of the terminal device a 405 and "s_pr", respectively, and then transfers the packet to the terminal device a 405 (S1014).

In this way, the terminal device a 405 receives the communication packet which has performed NAT traversal from the terminal device b 408 (S1015).

The terminal device a 405 replies to the communication packet received in S1015. With this, the NAT traversal from the terminal device a 405 to the terminal device b 408 is performed and P2P communication is established (S1016 and S1017).

With the flow of the above described processes, in the network configuration exemplified in FIG. 10, the NAT traversal is realized in the case where the port assignment classification of the lower layer NAT device a 404 is the Address Sensitive type or the Port Sensitive type and the port number issuance rule is the Port Reuse type. Specifically, the communication packet from the terminal device b 408 to the terminal device a 405 arrives at a port which is set as a NAT traversal purpose port provided at the lower layer NAT device a 404. With this, the communication packet passes through the lower layer NAT device a 404 and arrives at the terminal device a 405. In other words, the NAT traversal is performed in the communication from the terminal device b 408 to the terminal device a 405.

Moreover, by predicting a port number to be used next in the lower layer NAT device a 404, the predicted port number is set as a NAT traversal purpose port. Therefore, the communication packet from the terminal device a 405 to the terminal device b 408 is transmitted to the upper layer NAT device b 406 and the lower layer NAT device b 407 with the use of the same path (port number) as the communication packet from the terminal device b 408 to the terminal device a 405. Consequently, filtering is not performed for the communication packet by the two NAT devices. In other words, the NAT traversal is performed in the communication from the terminal device a 405 to the terminal device b 408, and thus the communication from the terminal device a 405 to the terminal device b 408 can be realized.

Specific Example 2 of Embodiment 2

Sequential Type

After the port number issuance rule identification unit 610 of the terminal device a 405 identifies that the port number issuance rule of the lower layer NAT device a 404 is the Sequential type, the NAT traversal purpose port determination unit 613 determines a port number in which a port mapping is set for the NAT traversal of the lower layer NAT device a 404 (S1002).

Here, a port number in which a port mapping setting should be performed when the lower layer NAT device a 404 is the Sequential type is a port number to be assigned in the next address translation in the lower layer NAT device a 404 and is calculated as below. For example, in the case where the source port number of the determination packet is "s'(3)" which is finally obtained after the execution of S802 to S812 more than once, the port number in which a port mapping setting should be performed is "s'(3)+(s'(3)−s'(2))".

Here, for the following description, the source port number which is used by the terminal device a 405 as the source of the notification request packet when transmitting the NAT traversal information in S1006 is determined as "s_se" and the port number which performs a port mapping setting for NAT traversal is determined as s'_se. It should be noted that s'_se=s'(3)+(s'(3)−s'(2)).

In this case, the NAT traversal purpose port mapping command unit 611 of the terminal device a 405, by using the NAT traversal purpose port number "s'_se" which is determined in S1002, performs a port mapping setting for the lower layer NAT device a 404 with the IGD of UPnP or the like (S1003, S1004, and S1005).

Hereafter, in the case where a packet comes from the WAN side to the number s'_se port of "192.168.10.2" which is the WAN-side IP address of the lower layer NAT device a 404, the lower layer NAT device a 404 translates the packet destination into the number s_se port of "192.168.11.2" which is the IP address of the terminal device a 405 and then transfers the packet to the terminal device a 405. In the packet transfer to the terminal device a 405, a port other than the number s_se may be designated as the destination port.

Next, the NAT traversal information is notified from the NAT traversal information notification unit 612 of the terminal device a 405 to the external server 401 (S1006). Specifically, the following processes are performed. In other words, the NAT traversal information notification unit 612 transmits, to the external server 401, the notification request packet in which the source IP address and the source number are determined as "192.168.11.2" and "s_se", respectively. The destination IP address of the notification request packet is "10.0.0.1" and the destination port number is any port number designated by the external server 401.

In this case, the source IP address and the source port number of the notification request packet after the address translation in the lower layer NAT device a 404 are "192.168.10.2" and "s'_se" respectively (S1007). Furthermore, address translation is performed also in the upper layer NAT device a 403 (S1008).

The source IP address and the source port after the translation at this time is "10.0.0.2" Moreover, the source port after the translation is designated as the number s"_se port.

The source IP address and the source port number of the communication request packet which arrives at the external server 401 are "10.0.0.2" and "s"_se", respectively, which are obtained by the address translation by the upper layer NAT device a 403. These pieces of information are stored as the NAT traversal information in the external server 401 (S1009).

Moreover, at this time, the notification request packet to be transmitted from the terminal device a 405 may be sent by the inclusion of an identifier, identification, or the like of the terminal device b 408 which is a communication partner of the terminal device a 405.

The external server 401 which has completed the process of S1009 notifies, of the NAT traversal information, the terminal device b 408 which is a communication partner of the terminal device a 405 (S1010 and S1011).

The information notified at this time includes "10.0.0.2" which is the WAN-side IP address of the upper layer NAT device a 403 and the port number "s"_se" after the address translation performed by the upper layer NAT device a 403, but may include pieces of information other than these.

The terminal device b 408 traverses NAT and accesses the terminal device a 405 with the use of the NAT traversal information notified from the external server 401 in S1011 (S1012).

The destination IP address and the destination port number of the communication packet at this time are "10.0.0.2" which is the WAN-side IP address of the upper layer NAT device a 403 which is indicated in the NAT traversal information obtained in S1011 and the port number "s"_se" after the address translation performed by the upper layer NAT device a 403 in communication between the terminal device a 405 and the external server 401.

On the receiving of the communication packet, the upper layer NAT device a 403 rewrites the destination IP address and the destination port number into "192.168.10.2" and "s'_se", respectively, and then transfers the packet to the lower layer NAT device a 404 (S1013).

In this case, the lower layer NAT device a 404 receives the communication packet which designates, as the destination, the WAN-side IP address itself and the number s'_se port for which port mappings are set in S1004 and S1005. Therefore, the lower layer NAT device a 404 rewrites the destination IP address and the destination port number of the communication packet into "192.168.11.2" of the IP address of the terminal device a 405 and "s_se", respectively, and transfers the packet to the terminal device a 405 (S1014)

In this way, the terminal device a 405 receives the communication packet which has performed NAT traversal from the terminal device b 408 (S1015).

The terminal device a 405 replies to the communication packet received in S1015. With this, the NAT traversal from the terminal device a 405 to the terminal device b 408 is performed and P2P communication is established (S1016 and S1017).

With the flow of the above described processes, in the network configuration exemplified in FIG. 10, the NAT traversal is realized in the case where the port assignment classification of the lower layer NAT device a 404 is the Address Sensitive type or the Port Sensitive type and the port number issuance rule is the Sequential type. Specifically, the communication packet from the terminal device b 408 to the terminal device a 405 arrives at a port which is set as a NAT traversal purpose port provided at the lower layer NAT device a 404. With this, the communication packet passes through the lower layer NAT device a 404 and arrives at the terminal device a 405. In other words, the NAT traversal is performed in the communication from the terminal device b 408 to the terminal device a 405.

Moreover, by predicting a port number to be used next in the lower layer NAT device a 404, the predicted port number is set as a NAT traversal purpose port. Therefore, the communication packet from the terminal device a 405 to the terminal device b 408 is transmitted to the upper layer NAT device b 406 and the lower layer NAT device b 407 with the use of the same path (port number) as the communication packet from the terminal device b 408 to the terminal device a 405. Consequently, filtering is not performed for the communication packet by the two NAT devices. In other words, the NAT traversal is performed in the communication from the terminal device a 405 to the terminal device b 408, and thus the communication from the terminal device a 405 to the terminal device b 408 can be realized.

The communication device and the communication method according to the present invention have been described based on the embodiments, but the present invention is not limited to the embodiments. Those skilled in the art will readily appreciate that various modifications may be made in these exemplary embodiments and other embodiments may be made by arbitrarily combining some of the structural elements of different exemplary embodiments without materially departing from the principles and spirit of the inventive concept, the scope of which is defined in the appended Claims and their equivalents.

The communication device according to the present invention can easily establish P2P communication with other communication devices even in a multilayer NAT environment which includes a NAT device without a port mapping setting function such as the IGD of UPnP. For example, if in the two-layer NAT environment having the upper layer and the lower layer NAT devices, the lower layer NAT device supports a port mapping setting function such as the IGD of UPnP, the port number issuance rule of the lower layer NAT device can be identified without the use of a device other than the external server. As a result, NAT traversal is possible even in the case where STUN-related NAT traversal scheme cannot be applied when P2P communication is performed in the above described multilayer NAT environment. Therefore, the present invention is effective as a technique for enhancing connectivity at a time of P2P communication.

REFERENCE SIGNS LIST 101, 104 Communication device
102, 205, 208 NAT device
103, 402 Internet
105 Address translation table
201 STUN server
202, 207 ISP NAT device
206, 209 Terminal device
302, 312, 322 Upper layer NAT device
303, 313, 323 Lower layer NAT device
400 Communication system
401 External server
403 Upper layer NAT device a
404 Lower layer NAT device a
405 Terminal device a
406 Upper layer NAT device b
407 Lower layer NAT device b
408 Terminal device b
501 CPU
502 Main storage device
503 Communication control device
504 External storage device
505 Input device
506 Output device
507 Bus
601 Connection environment check unit
602 Determination purpose port mapping command unit
603 Determination packet generation unit
604 Relay destination determination unit
605 Final destination determination unit
606 Destination port determination unit
607 Source port determination unit
608 Determination packet transmitting unit
609 Determination packet receiving unit
610 Port number issuance rule identification unit
611 NAT traversal purpose port mapping command unit
612 NAT traversal information notification unit
613 NAT traversal purpose port determination unit
615 Port number obtainment unit

The invention claimed is:

1. A communication device which communicates with a server device connected to the Internet, via (i) an upper layer Network Address Translation (NAT) device connected to the Internet and (ii) a lower layer NAT device connected to the upper layer NAT device, the communication device comprising:

a connection environment check unit configured to collect information indicating a Local Area Network (LAN)-side Internet Protocol (IP) address of the upper layer NAT device and information indicating a Wide Area Network (WAN)-side IP address of the lower layer NAT device;

a determination purpose port mapping command unit configured to issue a port mapping command for the lower layer NAT device to transfer a packet to the communication device, the packet arriving at a predetermined port number of the lower layer NAT device;

a determination packet generation unit configured to generate a determination packet which is source-routed, the determination packet generation unit including:

a relay destination determination unit configured to determine, as a relay destination of the determination packet, the LAN-side IP address of the upper layer NAT device collected by the connection environment check unit;

a final destination determination unit configured to determine, as a final destination of the determination packet, the WAN-side IP address of the lower layer NAT device collected by the connection environment check unit; and a destination port determination unit configured to determine, as a destination port number of the determination packet, a same port number as the predetermined port number used for the port mapping command;

a determination packet transmitting unit configured to transmit the determination packet generated by the determination packet generation unit;

a determination packet receiving unit configured to receive the determination packet which is transmitted from the determination packet transmitting unit, the determination packet being received by passing through the upper layer NAT device and the lower layer NAT device, and arriving at the communication device; and a port number obtainment unit configured to obtain a WAN-side port number of the lower layer NAT device which is a source port number indicated in the determination packet received by the determination packet receiving unit.

2. The communication device according to claim 1, further comprising
a NAT traversal information notification unit configured to cause the server device to notify NAT traversal information to another communication device communicating with the server device, by transmitting a notification request packet to the server device with use of a same source port number as the source port number of the determination packet generated by the determination packet generation unit,
wherein the NAT traversal information includes the WAN-side IP address and the WAN-side port number of the upper layer NAT device which are indicated in the notification request packet received by the server device.

3. The communication device according to claim 1, further comprising
a port number issuance rule identification unit configured to identify a port number issuance rule which is a rule for determining a WAN-side port number used for communication in the lower layer NAT device,
wherein the determination packet transmitting unit is configured to transmit a plurality of determination packets including the determination packet,
the determination packet receiving unit is configured to receive the determination packets transmitted by the determination packet transmitting unit,
the port number obtainment unit is configured to obtain the WAN-side port number of the lower layer NAT device which is indicated in each of the determination packets received by the determination packet receiving unit, and
the port number issuance rule identification unit is configured to identify the port number issuance rule based on a plurality of WAN-side port numbers including the WAN-side port number obtained by the port number obtainment unit.

4. The communication device according to claim 3, further comprising:
a NAT traversal purpose port determination unit configured to (i) determine, as a NAT traversal purpose port number, a WAN-side port number used by the lower layer NAT device for transferring a packet transmitted next from the communication device, and (ii) determine a source port number of a notification request packet corresponding to the NAT traversal purpose port number, the WAN-side port number being identified with use of a port number issuance rule identified by the port number issuance rule identification unit;
a NAT traversal purpose port mapping command unit configured to issue a port mapping command for the lower layer NAT device to transfer a packet to the communication device, the packet arriving at a NAT traversal purpose port number determined by the NAT traversal purpose port determination unit; and
a NAT traversal information notification unit configured to cause the server device to notify NAT traversal information to another communication device communicating with the server device, by transmitting the notification request packet to the server device with use of a source port number determined by the NAT traversal purpose port determination unit,
wherein the NAT traversal information includes the WAN-side IP address and the WAN-side port number of the upper layer NAT device which are indicated in the notification request packet received by the server device.

5. The communication device according to one of claim 3, wherein the determination packet transmitting unit is configured to transmit the determination packets having mutually different source port numbers, and
the port number issuance rule identification unit is configured to identify the port number issuance rule according to whether or not (a) a source port number of each of the determination packets when transmitted by the determination packet transmitting unit is identical to the WAN-side port number obtained by the port number obtainment unit, or (b) a difference is constant between two successively obtained WAN-side port numbers among WAN-side port numbers sequentially obtained by the port number obtainment unit.

6. A communication method performed by a communication device which communicates with a server device connected to the Internet, via (i) an upper layer Network Address Translation (NAT) device connected to the Internet and (ii) a lower layer NAT device connected to the upper layer NAT device, the communication method comprising:
collecting information indicating a Local Area Network (LAN)-side Internet Protocol (IP) address of the upper layer NAT device and information indicating a Wide Area Network (WAN)-side IP address of the lower layer NAT device;
issuing a port mapping command for the lower layer NAT device to transfer a packet to the communication device, the packet arriving at a predetermined port number of the lower layer NAT device;
generating a determination packet which is source-routed, including:
determining, as a relay destination of the determination packet, the LAN-side IP address of the upper layer NAT device collected;
determining, as a final destination of the determination packet, the WAN-side IP address of the lower layer NAT device collected; and
determining, as a destination port number of the determination packet, a same port number as the predetermined port number used for the port mapping command;
transmitting the determination packet which is generated;
receiving the determination packet which is transmitted from the determination packet transmitting unit, the determination packet being received by passing through the upper layer NAT device and the lower layer NAT device, and arriving at the communication device; and
obtaining a port number of the lower layer NAT device which is a source port number indicated in the determination packet received.

7. A program recorded on a non-transitory computer-readable recording medium for communicating with a server device connected to the Internet, via (i) an upper layer Network Address Translation (NAT) device connected to the Internet and (ii) a lower layer NAT device connected to the upper layer NAT device, the program comprising:
collecting information indicating a Local Area Network (LAN)-side Internet Protocol (IP) address of the upper layer NAT device and information indicating a Wide Area Network (WAN)-side IP address of the lower layer NAT device;
issuing a port mapping command for the lower layer NAT device to transfer a packet to the communication device, the packet arriving at a predetermined port number of the lower layer NAT device;

generating a determination packet which is source-routed, including:
- determining, as a relay destination of the determination packet, the LAN-side IP address of the upper layer NAT device collected;
- determining, as a final destination of the determination packet, the WAN-side IP address of the lower layer NAT device collected; and
- determining, as a destination port number of the determination packet, a same port number as the predetermined port number used for the port mapping command;

transmitting the determination packet which is generated;

receiving the determination packet which is transmitted, the determination packet being received by passing through the upper layer NAT device and the lower layer NAT device, and arriving at the communication device; and obtaining a port number of the lower layer NAT device which is a source port number indicated in the determination packet received.

8. An integrated circuit which communicates with a server device connected to the Internet, (i) via an upper layer Network Address Translation (NAT) device connected to the Internet and (ii) a lower layer NAT device connected to the upper layer NAT device, the integrated circuit comprising:

a connection environment check unit configured to collect information indicating a (Local Area Network) LAN-side Internet Protocol (IP) address of the upper layer NAT device and information indicating a Wide Area Network (WAN)-side IP address of the lower layer NAT device;

a determination purpose port mapping command unit configured to issue a port mapping command for the lower layer NAT device to transfer a packet to the communication device, the packet arriving at a predetermined port number of the lower layer NAT device;

a determination packet generation unit configured to generate a determination packet which is source-routed, the determination packet generation unit includes:
- a relay destination determination unit configured to determine, as a relay destination of the determination packet, the LAN-side IP address of the upper layer NAT device collected by the connection environment check unit;
- a final destination determination unit configured to determine, as a final destination of the determination packet, the WAN-side IP address of the lower layer NAT device collected by the connection environment check unit; and
- a destination port determination unit configured to determine, as a destination port number of the determination packet, a same port number as the predetermined port number used for the port mapping command;

a determination packet transmitting unit configured to transmit the determination packet which is generated by the determination packet generation unit;

a determination packet receiving unit configured to receive the determination packet which is transmitted from the determination packet transmitting unit, the determination packet being received by passing through the upper layer NAT device and the lower layer NAT device, and arriving at the communication device; and a port number obtainment unit configured to obtain a WAN-side port number of the lower layer NAT device which is a source port number indicated in the determination packet received by the determination packet receiving unit.

* * * * *